US012784439B1

(12) United States Patent
Khan

(10) Patent No.: US 12,784,439 B1
(45) Date of Patent: Nov. 3, 2026

(54) MULTI-SCALE RESIDUAL ATTENTION NETWORK FOR SCENE CLASSIFICATION USING AERIAL DATA

(71) Applicant: PRINCE MOHAMMAD BIN FAHD UNIVERSITY, Dhahran (SA)

(72) Inventor: Muhammad Attique Khan, Dhahran (SA)

(73) Assignee: PRINCE MOHAMMAD BIN FAHD UNIVERSITY, Dhahran (SA)

(*) Notice: Subject to any disclaimer, the term of this patent is extended or adjusted under 35 U.S.C. 154(b) by 0 days.

(21) Appl. No.: 19/641,655

(22) Filed: Apr. 8, 2026

(51) Int. Cl.
*G06V 20/17* (2022.01)
*G06V 10/764* (2022.01)
*G06V 10/82* (2022.01)

(52) U.S. Cl.
CPC ............ *G06V 20/17* (2022.01); *G06V 10/764* (2022.01); *G06V 10/82* (2022.01)

(58) Field of Classification Search
None
See application file for complete search history.

(56) References Cited

U.S. PATENT DOCUMENTS 10,943,145 B2 * 3/2021 Wang .................... G06F 18/251
2026/0065656 A1 * 3/2026 Li .......................... G06V 10/60

FOREIGN PATENT DOCUMENTS

CN 112150395 A * 12/2020 ........... G06F 18/214
CN 111797717 B * 3/2022 ............. G06N 3/045
CN 113567984 B 8/2023
CN 116777853 A * 9/2023 ........... G06T 7/0004
CN 117935009 A * 4/2024 ............. G06T 7/001
CN 112528896 B * 5/2024 ............ G06V 20/13
(Continued)

OTHER PUBLICATIONS

Jing Chang, et al., "Multi-Scale Attention Network for Building Extraction from High-Resolution Remote Sensing Images", Sensors 2024, vol. 24, Issue 3, 1010, pp. 1-17.
(Continued)

*Primary Examiner* — Jiangeng Sun
(74) *Attorney, Agent, or Firm* — Oblon, McClelland, Maier & Neustadt, L.L.P.

(57) ABSTRACT

A system and storage medium for alerting crop disease or pest infestation includes satellite-based and aerial remote imaging devices for capturing RGB images of the Earth and attach Earth location and date information to each RGB image. Machine learning processing circuitry includes a stem module to convert the RGB images into a high-dimensional feature map, and a multi-scale feature extractor including consecutive branches to learn representations at different resolutions and semantic levels. Each branch includes adaptive inverted blocks and multi-scale channel attention module. Each adaptive inverted block includes a spatial spectral attention block configured to process spectral and spatial features simultaneously. A cross-scale feature fusion 10 block integrates information across multiple spatial resolutions. A classification head classifies the RGB images to output crop class labels. Processing circuitry transmits images with disease or pest infestation labels to a subscription-based service provider, which sends alert messages to selected customers in respective growing regions.

20 Claims, 16 Drawing Sheets

(56) References Cited

FOREIGN PATENT DOCUMENTS

| | | | | | |
|---|---|---|---|---|---|
| CN | 114694014 B | * | 2/2025 | ........... | G06F 18/214 |
| CN | 119418278 A | * | 2/2025 | ........... | G06N 3/0464 |
| CN | 120047828 A | | 5/2025 | | |
| CN | 120430952 B | * | 9/2025 | | |
| CN | 121564354 B | * | 4/2026 | ........... | G06V 10/806 |

OTHER PUBLICATIONS

Qinggang Wu, et al., "Multi-Scale Spatial-Spectral Residual Attention Network for Hyperspectral Image Classification", Electronics 2024, vol. 13, Issue 2, 262, pp. 1-18.

* cited by examiner

MULTI-SCALE RESIDUAL ATTENTION NETWORK FOR SCENE CLASSIFICATION USING AERIAL DATA

BACKGROUND

Technical Field

The present disclosure is directed to remote sensing image analysis using machine learning based techniques for classification of aerial and satellite imagery for environmental monitoring, agricultural analysis, geospatial mapping, and related applications, and more particularly to identifying disease or pest infestation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crop disease and pest infestation has a significant impact on crop yield and food quality. Crop yield losses can be on the order of 20 to 40 percent. This yield loss impacts farm income, and global trade stability. Pests and diseases damage or even destroy crops. Damage to crops reduces food quality which can reduce sales. Destroyed crops reduce sales. Each poses a substantial economic impact. In addition, the reduced food quality can include food safety issues, where crops to be delivered may not pass inspection, or may later be recalled. Crop disease can lead to outbreaks that need to be controlled, and can hinder international and interstate trade in agriculture products. Further, heavy chemical usage to treat disease and pest infestation can have an impact on ecosystems.

In forests, trees may also be impacted by spread of disease or infestation by pests. In some cases, diseases or pests are introduced from other parts of the world. The spread of a disease can impact the health of certain tree species and may even cause certain tree species to die. In some cases, the spread of a disease or other debilitating growth, such as a fungus, can significantly reduce the growth of a tree species. In addition, certain pests can greatly impact growth and reproduction of certain tree species.

In the case of crops, the impact of a disease or pest infestation can be seen visually, as a reduction in density, discoloration, or slow or no growth. Slow growth and discoloration can be viewed early in a growing period, based on a comparison to normal growth under similar environmental conditions. Under close examination, early signs of pest infestation can be seen as pests on the plants themselves, or other signs that pests are infesting a plant, such as discoloration, holes, spots, undersized or discolored fruit.

In the case of a forest, the impact of disease or pest infestation can be visually, as unusually high reduction in budding or leafing, substantial increase in dead limbs, dead trees, reduction in density of certain tree species, reduction in height or growth rate of certain species.

It becomes necessary to detect a new disease or pest infestation, as well as to monitor the spread of a disease or pest infestation. Early detection and monitoring of a disease or pest infestation can help in bringing the disease or pest infestation under control. Also, determining the extent of a disease or pest infestation can help to inform others of the situation, so others can take appropriate action. In the case of a forest, it may be useful to determine the tree species that are impacted by a disease or pest infestation to determine if more than one type of tree species might be impacted.

Remote sensing is a type of photography that can be used to obtain Earth images for anywhere around the world, regions, or particular areas. Remote sensing imagary is obtained by a variety of sources, including imaging satellites, aircraft, ballones, and unmanned aerial vehicles (UAV) (also referred to as drones). For purposes of this disclosure, sources other than satellite, including aircraft, baloons, and UAVs will generally be referred to as aerial devices. Each source has an associated spatial resolution, where resolution means 1 pixel is for a spatial area on the ground. Imaging satellites range from low resolution of greater than 30 m per pixel, to high resolution of less than 5 m per pixel. Aircraft and baloons have a resolution on the order of a few centimeters per pixel. UAVs have the highest resolution of centimeters to sub-centimeters per pixel. Satellites can be used for imaging large areas, whereas aircraft, ballons, UAVs are generally used for imaging certain regions or areas. As such, satellite imagery can be used to identify crop types across agricultural regions, and monitor forest health in forest ecosystems. Images obtained by aircraft, baloons and UAVs may be used for more detailed view of crop or tree condition. An advantage of lower altitude remote sensing is a reduction in impact by cloud conditions. Satellites, on the other hand are generally good for frequent revisits to specific locations.

Other types of resolution in remote sensing can include spectral, radiometric, and temporal resolution. Spectral resolution relates to the number and width of electromagnetic bands, for example, RGB, near-infrared. Radiometric resolution relates to sensitivity to subtle differences in energy, for example brightness. Temporal resolution relates to how often an image is collected for a certain location. Satellites, due to their fixed orbits, tend to have the best revisit times. Aircraft and balloon remote sensing tend to be weather dependent, so are not reliable for periodic revisit times. On the other hand, satellite remote sensing can be impacted by cloud cover, and may not always obtain images that are useful, even though they are for a same location.

Remote sensing data can contain spectral and spatial information. Spectral information represents the reflectance characteristics of surface materials across different wavelength bands, allowing identification of objects such as vegetation, soil, or water. Spatial information represents structural characteristics such as texture, shape, patterns, and relationships between neighboring objects within an image. Accurate interpretation of remote sensing imagery therefore requires the effective integration of both spectral and spatial features. For instance, distinguishing between agricultural crops, grasslands, and forested areas may require analysis of spectral signatures together with spatial patterns observed in large-scale satellite images.

Conventional remote sensing image classification relies on manual interpretation or conventional machine learning approaches that extracted handcrafted features from imagery. These methods often involve predefined descriptors such as texture measures, color histograms, or spectral indices, followed by classification using algorithms such as support vector machines or random forests. While such techniques provided useful insights, they often require extensive manual feature engineering and expert knowledge. Moreover, handcrafted features frequently fail to capture the complex hierarchical representations required for accurate classification of large-scale and heterogeneous imagery.

Several deep learning architectures originally developed for natural image recognition have been adapted for remote sensing applications. In particular, convolutional neural networks have become widely adopted for remote sensing image analysis. Deep learning models automatically learn hierarchical feature representations from input data, enabling improved performance for tasks such as scene classification, object detection, and semantic segmentation. Example deep learning models include residual networks, dense convolutional networks, inception-based architectures, and efficient convolutional models.

Residual networks utilize skip connections to enable deeper network architectures by mitigating vanishing gradient problems during training. Dense convolutional networks introduce dense connectivity between layers to promote feature reuse and improve information flow throughout the network. Inception-based architectures employ multiple convolutional kernels with different receptive field sizes to capture multi-scale information from input images. Efficient convolutional models aim to reduce computational complexity while maintaining classification accuracy by optimizing network depth, width, and resolution.

Despite the improvements provided by these deep learning architectures, several challenges remain in the context of remote sensing image classification. Since some conventional deep learning models are designed primarily for natural images, they may not effectively capture the complex spectral and spatial characteristics of remote sensing data. For example, conventional architectures for natural images often rely on single-scale feature extraction mechanisms that may fail to adequately represent objects appearing at multiple spatial resolutions within large satellite images. Similarly, these conventional architectures may lack mechanisms for effectively representing spectral information, or do not effectively integrate spatial and spectral information simultaneously, which can reduce classification accuracy in heterogeneous environments.

In addition, deep learning models designed for general computer vision tasks can involve substantial computational overhead. Deep learning models have gradually increased in number of parameters in order to improve in generality and accuracy. High model complexity and large parameter counts may increase processing time and resource consumption, especially when analyzing large volumes of high-resolution remote sensing imagery. Such computational requirements can limit practical deployment in applications that require rapid analysis of continuously acquired satellite or aerial data streams.

Another challenge arises from the diversity and complexity of remote sensing environments. Scenes captured in satellite imagery often contain multiple objects with varying scales, textures, and spectral signatures. Agricultural landscapes, urban regions, forests, and water bodies may appear simultaneously within a single image. Furthermore, environmental factors such as seasonal variations, atmospheric conditions, and sensor differences can introduce additional variability. These complexities may lead to reduced classification accuracy when conventional models are applied to diverse datasets.

Various systems and services currently rely on remote sensing data for operational decision making. Environmental monitoring systems use satellite imagery to track ecosystem changes and land cover dynamics. Urban planning authorities analyze aerial images to monitor infrastructure development and land utilization patterns. Agricultural monitoring platforms analyze crop health, yield potential, and pest impacts through analysis of satellite data. Disaster management agencies rely on rapid interpretation of remote sensing imagery to assess damage and coordinate response activities. Geospatial information systems and mapping services also depend on automated classification of remote sensing data for generating maps and geographic datasets.

Commercial organizations increasingly provide large-scale Earth observation services that collect, process, and distribute remote sensing imagery. Satellite data providers and geospatial analytics companies develop platforms that enable customers to access processed imagery and derive insights from aerial and satellite data. Companies such as Planet Labs Inc., Maxar Technologies, Airbus Defence and Space, Environmental Systems Research Institute, and cloud-based geospatial analytics platforms provide tools and infrastructure for large-scale remote sensing analysis. Agricultural technology companies and digital farming platforms also utilize remote sensing imagery to support precision agriculture and crop monitoring services. These applications require accurate and efficient classification methods capable of analyzing complex imagery across large geographic regions.

However, existing remote sensing image classification technologies often experience limitations related to classification accuracy, scalability, and computational efficiency. Some conventional architectures provide limited capability for extracting multi-scale feature representations required to identify objects appearing at different spatial resolutions. Other models may not adequately represent spectral and spatial information within remote sensing imagery, thereby reducing the reliability of classification results. In addition, certain architectures may require substantial computational resources, which can increase operational costs and reduce efficiency when processing large volumes of aerial or satellite imagery.

Subsequently, conventional solutions remain inadequate for addressing the growing need for accurate, efficient, and scalable analysis of remote sensing imagery across diverse remote imaging sources.

An object is a system and method of extracting multi-scale representations from aerial and satellite imagery. A further object is a system and method of integrating spectral and spatial information, and providing accurate classification performance across complex and heterogeneous environments while maintaining computational efficiency.

SUMMARY

In an exemplary embodiment, a system for alerting crop pest or disease infestation is described. The system includes a subscription-based service provider including a database system configured to maintain customer account information including a growing region and an alert system configured to send out alert messages to selected customers. The system further includes satellite-based and aerial remote imaging devices to capture RGB images of Earth and attach Earth location and date information to each RGB image. The system further includes machine learning processing circuitry configured with a stem module to convert the RGB images into a high-dimensional feature map. The machine learning processing circuitry further includes a multi-scale feature extractor including a plurality of consecutive branches to learn representations of the high-dimensional feature map at different resolutions and semantic levels iteratively. Each branch includes at least one adaptive inverted block (AIB) and a multi-scale channel attention module. One branch includes a lightweight dense block (LDB) that reuses features across multiple scales. Each adaptive inverted block first projects an input feature map of a previous block into a higher-dimensional space, performs depthwise convolution to model spatial dependencies, and then projects back to a desired output dimension. Each adaptive inverted block includes a spatial spectral attention block, wherein the spatial spectral attention block is configured to process spectral and spatial features simultaneously to create a refined and informed feature map. The system further includes a cross scale feature fusion block configured to dynamically integrate information across multiple different spatial resolutions from the plurality of branches to obtain a fused feature map. The system further includes a classification head configured to classify the RGB images by processing the fused feature map through a plurality of parallel branches. An output of all the parallel branches is concatenated and passed through a 1×1 convolutional layer. A further concatenated feature map is passed through a series of final layers to generate a final classification. The system further includes an output device configured to output a crop class label for a final concatenated image for each of the RGB images. The system further includes processing circuitry configured to organize the RGB images labeled with crop class label by the location and the date. The processing circuitry further transmits RGB images, together with class label, location and date to the subscription-based service provider when the class label is for a disease or pest infestation type. The subscription-based service provider sends out an alert message to selected customers in a respective growing region to inform of the location and the type of pest or disease infestation.

In an aspect, the multi-scale feature extractor includes a first branch having two adaptive inverted blocks followed by a first respective multi-scale channel attention module to extract low-level features and select informative channels. The multi-scale feature extractor further includes a second branch having two adaptive inverted blocks, a lightweight dense block, and a second respective multi-scale channel attention module, to extract second features and select informative channels higher than the first branch. The multi-scale feature extractor further includes a third branch having three adaptive inverted blocks followed by a third respective multi-scale channel attention module, to extract third features and select informative channels higher than the second branch. The multi-scale feature extractor further includes a fourth branch having two adaptive inverted blocks followed by a fourth respective multi-scale channel attention module, to extract third features and select informative channels higher than the third branch.

In another aspect, the spatial spectral attention block takes a feature map of an associated adaptive inverted block and applies max and average pooling simultaneously to obtain respective feature maps.

In another aspect, the respective feature maps are passed to their corresponding 1×1 convolutional layers, which create a bottleneck and reduce feature channels by a factor of 16. A resultant reduced feature map is passed through ReLU activation, which follows a 1×1 convolutional layer to restore original dimensions to processed feature maps. The processed feature maps are passed to an additional layer to generate a fused feature map. A sigmoid activation function is applied on the fused feature map to generate attention weights that are multiplied with the original input channels to create a spectrally informed feature map.

In another aspect, the spectrally informed feature map is passed through spatial attention, where a mean and a max of the feature map are computed simultaneously. The mean and the max feature maps are aggregated along channel dimension and pass through a 7×7 convolutional layer followed by batch norm to create a single feature map. A sigmoid activation function is applied to generate spatial attention weights. The spatial attention weights are multiplied with the spectrally informed feature map to add spatial information to the feature map.

In another aspect, the output of the spatial spectral block is added to the original feature map that passed to the AIB, forming a residual connection when input dimensions are equal to the output dimensions and stride is equal to 1.

In another aspect, the lightweight dense block is configured to capture hierarchical feature representations at different abstraction levels within the same spatial scale.

In another aspect, the lightweight dense block is configured with three dense layers, wherein the first dense layer has a kernel size of 1×1, while the second kernel size is 3×3.

In another aspect, the lightweight dense block is configured such that output of a first dense layer is concatenated with the original input and passed to a second dense layer, where all operations repeat themselves. Output of the second dense layer is concatenated with the output of the first dense layer and the original input and passed to a third dense layer. After passing through the same sequence of operations, a resultant feature map is concatenated with the original input, the output of the first dense layer, and the output of the second dense layer to create a final feature representation.

In another aspect, the multi-scale channel attention module dynamically weighs channel importance across different scales using multiple convolution kernel sizes.

In another exemplary embodiment, a non-transitory computer-readable storage medium including computer executable instructions is described. The instructions, when executed by a computer, cause the computer to perform a method for alerting crop disease or pest infestation. A subscription-based service provider includes a database system configured to maintain customer account information including a growing region and an alert system configured to send out alert messages to selected customers. The method includes capturing, by satellite-based and aerial remote imaging devices, RGB images of Earth and attaching Earth location and date information to each RGB image. The method further includes converting, by a stem module of a machine learning processing circuitry, the RGB images into a high-dimensional feature map. The method further includes learning, by a multi-scale feature extractor of the machine learning processing circuitry including a plurality of consecutive branches, representations of the high-dimensional feature map at different resolutions and semantic levels iteratively. Each branch includes at least one adaptive inverted block (AIB) and a multi-scale channel attention module. One branch includes a lightweight dense block (LDB) that reuses features across multiple scales. Each adaptive inverted block first projects an input feature map into a higher-dimensional space. The adaptive inverted block performs depthwise convolution to model spatial dependencies. The adaptive inverted block projects back to a desired output dimension. Each adaptive inverted block includes a spatial spectral attention block. The spatial spectral attention block processes spectral and spatial features simultaneously to create a refined and informed feature map. The method further includes dynamically integrating, by a cross scale feature fusion block, information across multiple different spatial resolutions from the plurality of branches to obtain a fused feature map. The method further includes classifying, by a classification head, the RGB images by processing the fused feature map through a plurality of parallel branches. The method further includes concatenating an output of all the parallel branches and passing through a 1×1 convolutional layer. The method further includes passing a further concatenated feature map through a series of final layers to generate a final classification. The method further includes outputting, by an output device, a crop class label for a final concatenated image for each of the RGB images. The method further includes organizing, by processing circuitry, the RGB images labeled with crop class label by the location and the date. The method further includes transmitting RGB images, together with class label, location and date to the subscription-based service provider when the class label is for a pest or disease infestation type. The subscription-based service provider sends out an alert message to selected customers in a respective growing region to inform of the location and the type of pest or disease infestation.

In an aspect, the method further includes extracting, by a first branch having two adaptive inverted blocks followed by a first respective multi-scale channel attention module, low-level features and selecting informative channels. The method further includes learning, by a second branch having two adaptive inverted blocks, a lightweight dense block, and a second respective multi-scale channel attention module, second features at a resolution and semantic level higher than the first branch. The method further includes learning, by a third branch having three adaptive inverted blocks followed by a third respective multi-scale channel attention module, third features at a resolution and semantic level higher than the second branch. The method further includes learning, by a fourth branch having two adaptive inverted blocks followed by a fourth respective multi-scale channel attention module, fourth features at a resolution and semantic level higher than the third branch.

In another aspect, the method further includes taking, by the spatial spectral attention block, a feature map of an associated adaptive inverted block. The method further includes applying max and average pooling simultaneously to obtain respective feature maps.

In another aspect, the method further includes reducing, by passing the respective feature maps to their corresponding 1×1 convolutional layers, which create a bottleneck, feature channels by a factor of 16. The method further includes restoring, by a resultant reduced feature map that is passed through ReLU activation, which follows a 1×1 convolutional layer, original dimensions to processed feature maps. The method further includes generating, by passing the processed feature maps to an additional layer, a fused feature map. The method further includes creating, by applying a sigmoid activation function on the fused feature map and generating attention weights that are multiplied with the original input channels, a spectrally informed feature map.

In another aspect, the method further includes simultaneously computing, by passing the spectrally informed feature map through spatial attention, mean and max of the feature map. The method further includes creating, by aggregating the mean and max feature maps along channel dimension and passing through a 7×7 convolutional layer followed by batch norm, a single feature map. The method further includes applying a sigmoid activation function to generate spatial attention weights. The method further includes multiplying the spatial attention weights with the spectrally informed feature map to add spatial information to the feature map.

In another aspect, the method further includes adding the output of the spatial spectral block to the original feature map that passed to the AIB, forming a residual connection when input dimensions are equal to the output dimensions and stride is equal to 1.

In another aspect, the method further includes capturing, by the lightweight dense block, hierarchical feature representations at different abstraction levels within the same spatial scale.

In another aspect, the lightweight dense block is configured with three dense layers, wherein the first dense layer has a kernel size of 1×1, while the second kernel size is 3×3.

In another aspect, the method further includes concatenating an output of a first dense layer with the original input and passing to a second dense layer, where all operations repeat themselves. The method further includes concatenating an output of the second dense layer with the output of the first dense layer and the original input and passing to a third dense layer. The method further includes concatenating a resultant feature map with the original input, the output of the first dense layer, and the output of the second dense layer to create a final feature representation.

In another aspect, the method further includes dynamically weighing, by the multi-scale channel attention module, channel importance across different scales using multiple convolution kernel sizes.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
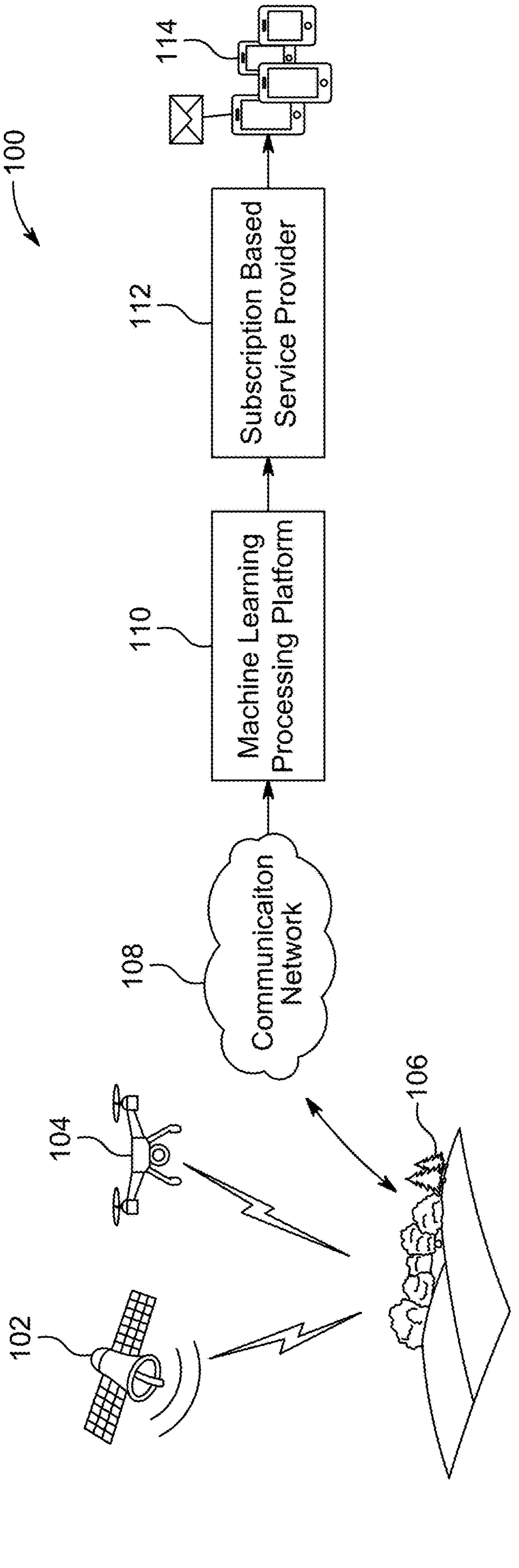
FIG. 1A is a diagram of a remote sensing image classification system illustrating acquisition of remote sensing imagery and transmission of the imagery to a machine learning processing platform for analysis.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Remote sensing imagery obtained from satellites and aerial platforms plays an important role in applications such as agricultural monitoring, environmental assessment, geospatial mapping, and disaster management. Accurate interpretation of such imagery requires the ability to analyze both spatial patterns and spectral characteristics present in large-scale Earth observation data. However, many conventional deep learning architectures used for image classification rely on single-scale feature extraction or domain-agnostic designs originally developed for natural image recognition. As a result, these models often experience limitations when applied to complex remote sensing environments in which objects appear at different spatial scales and exhibit diverse spectral signatures.

In particular, conventional approaches frequently encounter difficulties in effectively extracting features across multiple spatial resolutions and integrating spectral and spatial information within a unified representation. Some conventional models are unable to adequately capture fine-grained local patterns together with broader contextual features present within large satellite images. Most conventional approaches involve high computational overhead, which can limit practical deployment in systems required to process large volumes of aerial and satellite imagery in real time or near real time.

A machine learning architecture is provided that addresses these challenges through a multi-scale feature learning framework designed for remote sensing image classification. The architecture processes imagery through multiple branches operating at different resolutions to learn hierarchical representations of the observed scene. Adaptive feature transformation blocks enable efficient modeling of spatial dependencies, while spatial-spectral attention processing simultaneously integrates spatial structures and spectral characteristics present in the imagery. In addition, hierarchical feature reuse and cross-scale feature integration mechanisms combine information from multiple resolutions to generate a unified representation suitable for classification.

Through the combination of multi-scale feature extraction, spatial-spectral attention processing, hierarchical feature reuse, and cross-resolution feature aggregation, the described system supports accurate interpretation of aerial and satellite imagery. This approach enables more reliable classification of complex remote sensing scenes and facilitates large-scale deployment for applications such as agricultural monitoring, forest management, geospatial information systems, and Earth observation services.

FIG. 1A illustrates a system 100 for alerting crop disease or pest infestation. The system 100 is configured to capture red green blue (RGB) images of the Earth, classify the RGB images using machine learning processing circuitry, and transmit alert messages to selected customers when a class label indicates a disease or pest infestation type. The system 100 implements a remote sensing architecture for enhanced agricultural monitoring, where satellite-based and aerial remote imaging devices capture RGB images that are computationally processed to generate crop class labels for disease surveillance and pest management applications.

The system 100 comprises an imaging satellite 102 positioned in orbit above a surface region. The imaging satellite 102 is a satellite-based remote imaging device configured to capture RGB images of the Earth and attach Earth location and date information to each RGB image. The imaging satellite 102 is implemented using one or more imaging mechanisms, including, but not limited to, multispectral sensors, hyperspectral imagers, and high-resolution optical cameras. In one example, the imaging satellite 102 may operate in low Earth orbit (LEO) at altitudes ranging from approximately 400 kilometers to approximately 800 kilometers, providing coverage of agricultural regions with spatial resolutions ranging from sub-meter to several meters. The imaging satellite 102 captures RGB images at predetermined temporal intervals, such as daily, weekly, or on-demand basis, depending on monitoring requirements and orbital parameters.

The system 100 further includes an aerial remote imaging device 104. The aerial remote imaging device 104 is configured to capture RGB images of the Earth and attach Earth location and date information to each RGB image. In one aspect, the aerial remote imaging device 104 is implemented as an unmanned aerial vehicle (UAV), also referred to as a drone. The aerial remote imaging device 104 implemented as a UAV operates at lower altitudes compared to the imaging satellite 102, typically ranging from approximately 30 meters to approximately 400 meters above ground level, providing higher spatial resolution imagery suitable for detailed crop inspection and localized pest detection. The aerial remote imaging device 104 may be equipped with global positioning system (GPS) receivers, inertial measurement units, and onboard storage for georeferencing the captured RGB images.

The system 100 further includes a growing region 106. The growing region 106 represents an agricultural field, cropland, or any surface region where crops are cultivated and monitored for disease or pest infestation. The growing region 106 serves as the target area for image capture by the imaging satellite 102 and the aerial remote imaging device 104. In various implementations, the growing region 106 may encompass different crop types, including but not limited to grains, vegetables, fruits, and commercial plantations.

The system 100 further includes a communication network 108 operably connecting the remote imaging devices to processing components. The communication network 108 facilitates data transmission between the satellite 102, the aerial remote imaging device 104, and downstream processing systems. The communication network 108 may be implemented using a combination of satellite communication links, cellular networks, wireless local area networks, and internet protocol-based data transmission infrastructure.

The system 100 further comprises a machine learning processing platform 110. The machine learning processing platform 110 is configured to receive RGB images from the imaging satellite 102 and the aerial remote imaging device 104 via the communication network 108. The machine learning processing platform 110 implements machine learning processing circuitry that converts the RGB images into high-dimensional feature maps and classifies the RGB images to generate crop class labels. The machine learning processing platform 110 includes a multi-scale residual attention network (MSRA-Net) architecture that extracts spatial and spectral features from the RGB images at multiple resolutions. The detailed architecture of the machine learning processing circuitry is illustrated in FIG. 1C.

The system 100 further includes a subscription-based service provider 112. The subscription-based service provider 112 includes a database system configured to maintain customer account information including a growing region, and an alert system configured to send out alert messages to selected customers. The subscription-based service provider 112 receives RGB images, together with class label, location and date from the machine learning processing platform 110 when the class label is for a disease or pest infestation type. The subscription-based service provider 112 then sends out an alert message to selected customers in a respective growing region to inform of the location and the type of disease or pest infestation.

The system 100 further includes customer devices 114. The customer devices 114 represent end-user devices configured to receive alert messages from the subscription-based service provider 112. The customer devices 114 may include smartphones, tablets, desktop computers, and electronic mail systems. The alert messages transmitted to the customer devices 114 contain information regarding the location, date, and type of disease or pest infestation detected in the respective growing region, enabling customers to take timely remedial actions.

Figure 1B:
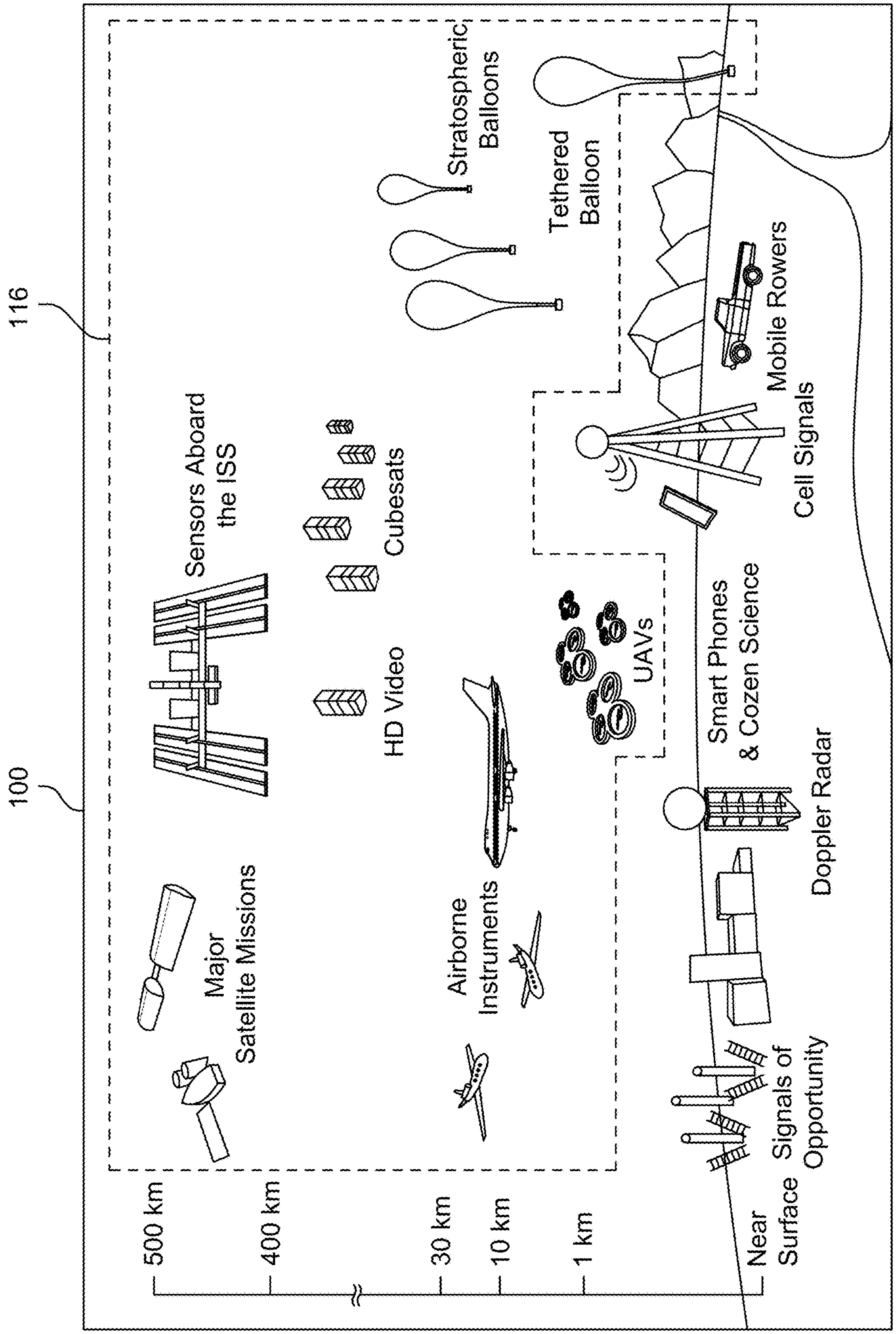
FIG. 1B is an illustration of a non-limiting example of a multi-layer remote sensing environment in which sensing platforms operating at different altitudes collect imagery and sensing data.
Figure 1C:
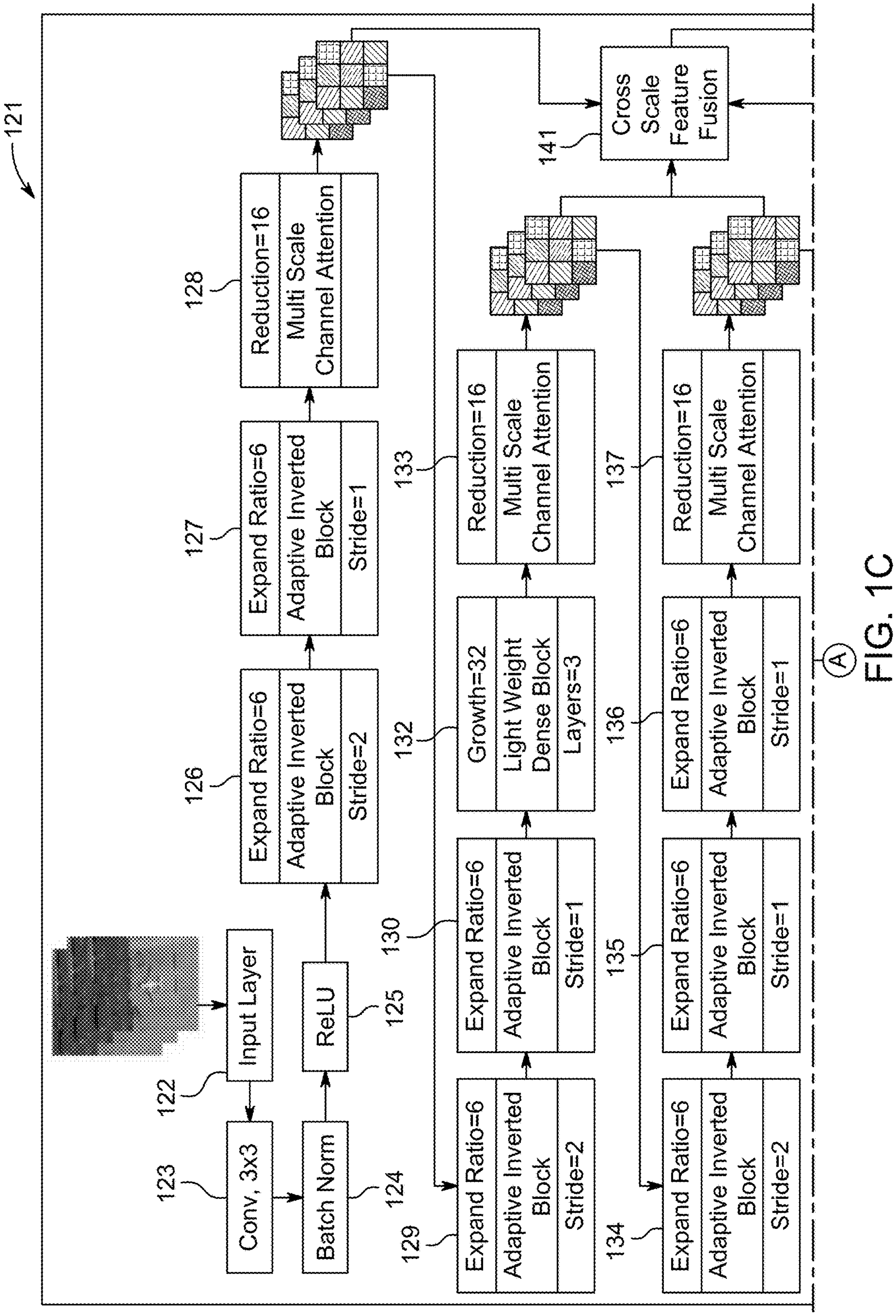
FIG. 1C is a schematic diagram illustrating a machine learning architecture for processing remote sensing imagery.
Figure 1C:
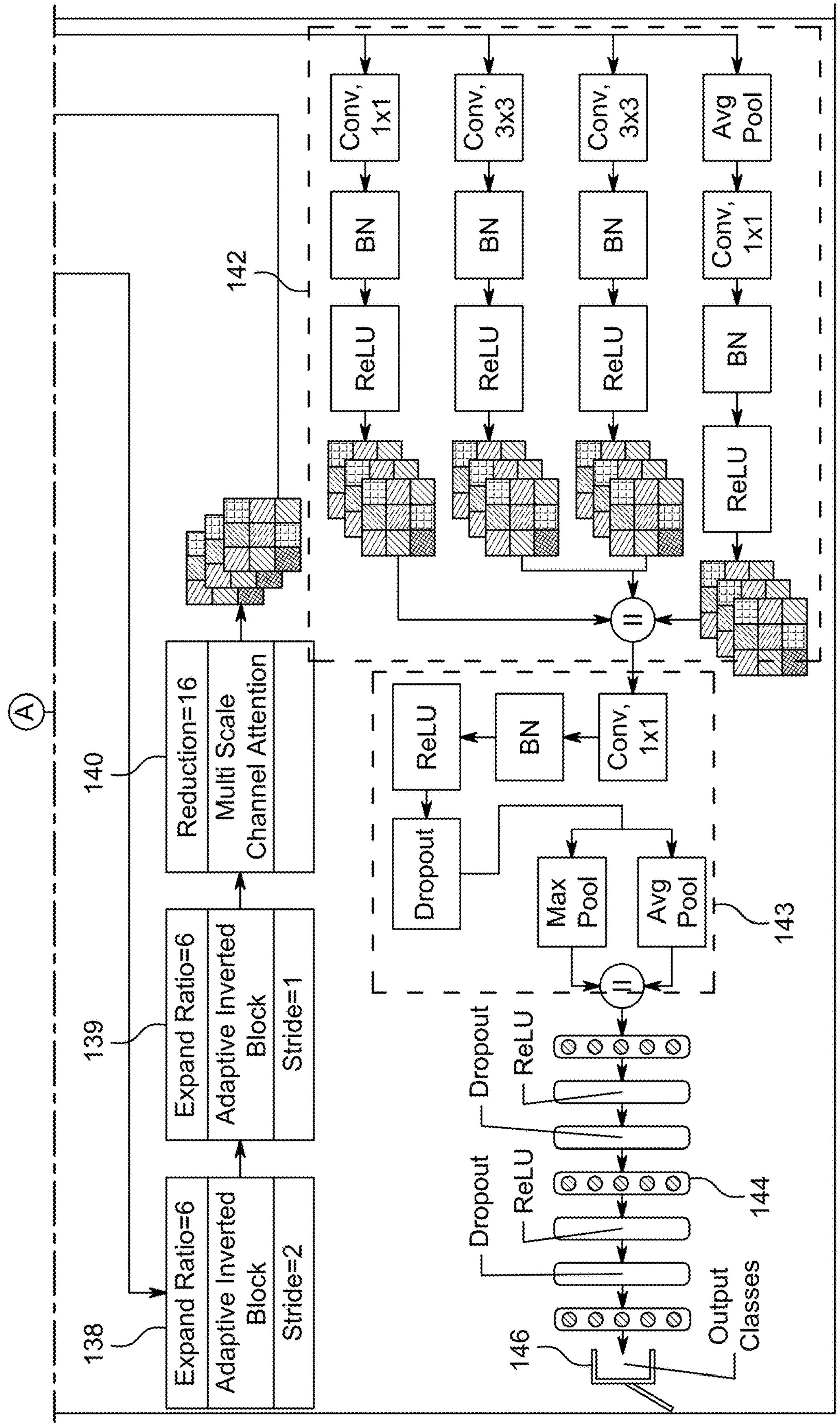

FIG. 1B depicts multiple types of remote imaging platforms, primarily a multi-altitude aerial and near-surface sensing system for capturing diverse spatial and spectral data relevant to real-time aerial image recognition applications, in accordance with an exemplary aspect of the disclosure. The sensing environment illustrated in FIG. 1B represents a multi-altitude remote sensing ecosystem from which Earth observation imagery may be obtained. Different sensing platforms operate at different observational scales and capture imagery with varying spatial resolution and contextual detail. Ground-level and near-surface sensing devices provide localized observations, airborne platforms provide intermediate-scale aerial imagery, and orbital sensing platforms provide wide-area Earth observation data. The heterogeneous imagery generated by these platforms contains spatial and spectral information at multiple contextual scales. The machine learning processing architecture described in FIG. 1C is configured to process such multi-scale imagery to perform automated remote sensing image classification for agricultural monitoring applications.

The remote sensing system 100 extends vertically from near-surface level up to approximately 500 kilometers altitude, with graduated altitude markers at 1 km, 10 km, 30 km, 75 km, 400 km, and 500 km. This vertical stratification organizes sensing devices and platforms according to their operational altitudes. At the lowest altitude near the surface, ground-based signal sources and sensors, such as "Signals of Opportunity," are depicted as antenna-like structures emitting signals upward. Adjacent urban infrastructure elements, including buildings and communication towers, which constitute terrestrial data sources and relay stations. A Doppler radar installation is also illustrated, indicating the presence of active remote sensing instrumentation.

Ascending to the lower atmosphere, airborne instruments including fixed-wing aircraft and UAVs are positioned between approximately 1 km and 10 km altitude. UAVs are shown in clusters, emphasizing their role in capturing high-resolution aerial imagery and environmental data at variable spatial scales. Further upward, stratospheric platforms such as tethered and free-floating balloons are positioned near 30 km altitude, serving as stable observation points for prolonged data acquisition over wide areas.

At altitudes approaching low Earth orbit, satellite-based sensing platforms are depicted, including the International Space Station (ISS) and smaller satellite constellations such as cubesats, orbiting at approximately 400 km to 500 km altitude. Interspersed among these platforms are communication and data relay elements, including cell signal towers and mobile rovers, facilitating data transmission and ground truth validation. The presence of smartphones and citizen science icons near the surface level indicates integration of crowdsourced data within the remote sensing ecosystem.

Functionally, the components of system 116 operate synergistically to provide multi-scale, multi-resolution data inputs that the ASSPN architecture processes. The diverse altitude platforms capture imagery and sensor data at varying spatial resolutions and contextual scales, which are then fed into the Gaussian Pyramid Module for adaptive multi-scale feature extraction. The hierarchical arrangement of sensing platforms corresponds to the multi-scale inputs processed by the network, enabling dynamic recalibration of feature importance across scales.

FIG. 1C illustrates a multi-scale residual attention network architecture 121 for remote sensing image classification. The multi-scale residual attention network architecture 121, also referred as to the architecture 121, is configured to address drawbacks of previous remote sensing classification networks by combining multi-scale feature extraction with attention methods in a computationally lightweight structure. The architecture 121 consists of five main components, including a spatial spectral attention module, a lightweight dense block, a multi-scale channel attention mechanism, adaptive inverted blocks, and a cross-scale feature fusion module. The architecture 121 is arranged to process RGB input images through a sequence of feature extraction, multi-branch representation learning, channel attention refinement, dense feature reuse, and cross-scale feature aggregation operations to construct deep feature representations for a final layer. The representation generated by the architecture 121 is classified (i.e., outputs classes 146) with an Atrous Spatial Pyramid Pooling based classification head, which enhances ability of the architecture 121 to extract contextual information over receptive fields of various sizes.

The architecture 121 begins with an input layer 122 configured to receive RGB input images. The RGB input images may correspond to aerial images, satellite images, remote sensing scene images, land-use images, environmental monitoring images, agricultural monitoring images, urban planning images, climate analysis images, disaster assessment images, geospatial mapping images, or other remote sensing imagery represented by three color channels. The input layer 122 provides the RGB input images to a stem module.

A stem module in deep learning, particularly in computer vision, is an initial set of layers in a neural network designed to preprocess raw input data by reducing spatial size and extracting low-level features before the main body of the network. In an embodiment, the stem module is formed by a convolution stage 123, a batch normalization stage 124, and a rectified linear unit stage 125. The stem module functions as a first feature extractor by processing RGB input images and converting the RGB input images into high-dimensional representations for deep networks. The stem module expands the number of feature channels while also reducing spatial resolution to provide a more stable basis for deep feature extraction. In the arrangement shown in FIG. 1C, the convolution stage 123 is implemented as a single 3×3 convolutional layer, the batch normalization stage 124 performs normalization of convolutional outputs, and the rectified linear unit stage 125 applies ReLU activation to generate a resultant feature map. The mathematical operation of the stem module is defined as:

$$F_i = \sigma'\left(\phi(W_i * X + b_i)\right) \tag{1}$$

where X denotes the input features, $\phi$ is batch normalization, $\sigma'$ denotes ReLU layer, $W_i$ and $b_i$ denote the weights and bias term of convolutional layer, * represents convolutional operation, and $F_i$ indicates the resultant feature map. The resultant feature map generated by the stem module is supplied to a multi-scale feature extractor defined by a number of consecutive branches arranged in the architecture 121 to learn representations at different resolutions and semantic levels iteratively. For purposes of ease of explanation, the architecture 121 is described as having four branches. The architecture 121 can be configured with more or less branches to accommodate a desired number of scales, as well as to take into consideration computational complexity.

A first branch of the multi-scale feature extractor includes an adaptive inverted block 126, an adaptive inverted block 127, and a multi-scale channel attention module 128. In particular, the first branch utilizes the adaptive inverted block 126 and the adaptive inverted block 127 followed by the multi-scale channel attention module 128. The first branch is configured to extract low-level features and to augment representation power using the multi-scale channel attention module 128 that selects informative channels. In the arrangement shown in FIG. 1C, the adaptive inverted block 126 operates with an expand ratio equal to 6 and stride equal to 2, and the adaptive inverted block 127 operates with an expand ratio equal to 6 and stride equal to 1. The adaptive inverted block 126 and the adaptive inverted block 127 are configured to enhance representational strength and to create a balance between expressiveness and efficiency. Each adaptive inverted block first projects an input feature map into a higher-dimensional space, performs depthwise convolution to model spatial dependencies, and then projects back to a proper output space. Each adaptive inverted block is defined by number of input channels, number of output channels, stride, and expansion ratio. Hidden dimensions are calculated by multiplying number of input channels by expansion ratio. When the expansion ratio is greater than 1, a 1×1 convolutional layer is applied to the input feature map, followed by batch normalization and a ReLU activation, to expand channel representations into a hidden space. When the expansion ratio is equal to 1, the expansion step is skipped, and the feature map is passed directly to a depthwise convolutional layer. A 3×3 depthwise convolutional layer processes each feature channel independently, focusing on spatial relationships within features rather than mixing information across channels. A 1×1 pointwise convolutional layer followed by batch normalization compresses the feature channels into desired output dimensions. Each adaptive inverted block further includes a spatial spectral attention block configured to process spectral and spatial features simultaneously to create a refined and informed feature map. The output of the adaptive inverted block 127 is refined by the multi-scale channel attention module 128.

The multi-scale channel attention module 128 is configured to dynamically weight channel importance across different scales using multiple convolution kernel sizes. The multi-scale channel attention module 128 receives an input feature map and first passes the input feature map through an average pooling layer that reduces spatial dimensions to 1×1. Three parallel convolutional layers are then employed with different kernel sizes, such as 1×1, 3×3, and 5×5. Resultant feature maps are compressed channel-wise by a ratio of 16 before being concatenated along a channel dimension. The concatenated feature map is passed through a 1×1 convolutional layer that restores an original number of channels before applying sigmoid activation to generate attention weights. The attention weights are multiplied by the original input tensor to generate a weighted feature map. The weighted feature map generated by the multi-scale channel attention module 128 is the final output of the first branch. The first branch therefore provides low-level features together with channel-selective enhancement for subsequent branch processing and cross-scale aggregation.

A second branch of the multi-scale feature extractor includes an adaptive inverted block 129, an adaptive inverted block 130, a lightweight dense block 132, and a multi-scale channel attention module 133. The second branch receives feature information from the first branch and is configured to learn features at a higher resolution and semantic level than the first branch while preserving computational efficiency. In the arrangement shown in FIG. 1C, the adaptive inverted block 129 is a simple block with stride equal to 2 and expand ratio equal to 6, and the adaptive inverted block 130 is a residual block with stride equal to 1 and expand ratio equal to 6. The adaptive inverted block 129 transforms the feature map from [B, 64, 56, 56] to [B, 128, 28, 28], where B denotes batch size, 64 and 128 represent number of channels, and 56×56 and 28×28 represent spatial dimensions. The adaptive inverted block 130 keeps feature dimensions same as before and therefore functions as a residual block at the same spatial scale. The second branch further includes the lightweight dense block 132 with growth equal to 32 and layers equal to 3. The lightweight dense block 132 is configured to capture hierarchical feature representations at different abstraction levels within the same spatial scale. The lightweight dense block 132 enables the architecture 121 to learn both complex patterns and fine-grained details progressively. The lightweight dense block 132 is composed of three dense layers, with each dense layer consisting of an additional six sublayers. The sublayers include two sets of batch normalization, ReLU, and convolutional layers. In a first set, kernel size of the convolutional layer is kept at 1×1, while in a second set the kernel size is increased to 3×3. A first dense layer receives input from the adaptive inverted block 130 and applies batch normalization and ReLU activation. A 1×1 convolutional layer reduces channels from 128 to 32 and passes the feature map to another set of batch normalization and ReLU. A 3×3 convolutional layer is then applied while feature dimensions remain same. Output of the first dense layer is concatenated with original input and passed to a second dense layer where operations repeat. Output of the second dense layer is concatenated with output of the first dense layer and original input and passed to a third dense layer. After passing through the same sequence of operations, a resultant feature map is concatenated with original input, output of the first layer, and output of the second layer to create a final feature representation. The final feature representation generated by the lightweight dense block 132 is supplied to the multi-scale channel attention module 133. The multi-scale channel attention module 133 is configured with reduction equal to 16 and operates in the same manner as the multi-scale channel attention module 128 to dynamically weight channel importance across different scales using multiple convolution kernel sizes.

A third branch of the multi-scale feature extractor includes an adaptive inverted block 134, an adaptive inverted block 135, an adaptive inverted block 136, and a multi-scale channel attention module 137. The third branch receives feature information from the second branch and is configured to learn higher semantic features and reduced spatial resolution relative to the second branch. In the arrangement shown in FIG. 1C, the adaptive inverted block 134 is a simple block with stride equal to 2 and expand ratio equal to 6, and the adaptive inverted block 135 and the adaptive inverted block 136 are residual blocks with stride equal to 1 and expand ratio equal to 6. The third branch therefore consists of three adaptive inverted blocks followed by the multi-scale channel attention module 137. The first adaptive inverted block in the third branch expands channel dimension from 224 to 256 and reduces spatial dimensions from 28×28 to 14×14. The second adaptive inverted block and the third adaptive inverted block are residual and preserve feature dimensions at that scale. After processing by the adaptive inverted block 136, the feature map is passed through the multi-scale channel attention module 137 configured with reduction equal to 16. The multi-scale channel attention module 137 generates a weighted feature map by channel attention refinement and provides a branch output having higher semantic content for cross-scale feature integration.

A fourth branch of the multi-scale feature extractor continues below the branch set shown at the upper portion of FIG. 1C and follows the branch structure described in the disclosure. The fourth branch consists of two adaptive inverted blocks 138, 139, followed by a multi-scale channel attention module 140. A first adaptive inverted block 138 of the fourth branch is non-residual and transforms the feature map to a next spatial scale. A second adaptive inverted block 139 of the fourth branch is residual and does not change feature dimensions. A final multi-scale channel attention module 140 of the fourth branch performs channel importance weighting across different scales using multiple convolution kernel sizes, thereby providing a branch output corresponding to a deeper semantic level than the third branch. The four consecutive branches of the multi-scale feature extractor therefore learn representations at different resolutions and semantic levels iteratively, where each branch uses adaptive inverted blocks, multi-scale channel attention modules, and lightweight dense blocks to maximize feature learning and computation performance, respectively.

The adaptive inverted blocks incorporated throughout the architecture 121 include spatial spectral attention processing as part of block-level refinement. As mentioned above the remote sensing images consist of two types of information, namely spectral information and spatial information. Spectral information refers to intrinsic material properties of surface features, captured in reflectance of varying wavelength bands. Spatial information describes structural properties of a scene, such as texture, patterns, and spatial relationship between objects. Context from spatial features is required to understand and classify scenes accurately, while material discrimination from spectral features complements the spatial information.

The spatial spectral attention processing included within the adaptive inverted blocks takes an input feature map and applies max pooling and average pooling simultaneously to obtain respective feature maps. The respective feature maps are passed to corresponding 1×1 convolutional layers, which create a bottleneck and reduce feature channels by a factor of 16. A resultant reduced feature map is passed through ReLU activation, which follows a 1×1 convolutional layer to restore original dimensions to processed feature maps. The processed feature maps are passed to an additional layer to generate a fused feature map, and a sigmoid activation function is applied on the fused feature map to generate attention weights that are multiplied with original input channels to create a spectrally informed feature map. The spectrally informed feature map is then passed through spatial attention, where mean and max of the feature map are computed simultaneously. The mean and max feature maps are aggregated along a channel dimension and pass through a 7×7 convolutional layer followed by batch norm to create a single feature map. A sigmoid activation function is applied to generate spatial attention weights, which are multiplied with the spectrally informed feature map to add spatial information to the feature map. Output of the spatial spectral block is added to the original feature map that passes to the adaptive inverted block, forming a residual connection when input dimensions are equal to output dimensions and stride is equal to 1. Otherwise, output of spatial spectral attention processing is considered a final output of the respective adaptive inverted block. The arrangement of the adaptive inverted blocks in branches one, two, three, and four therefore supports feature transformation, spatial dependency modeling, and simultaneous spectral and spatial refinement at multiple depths of the architecture 121.

Outputs from the four branches are supplied to a cross scale feature fusion module 141. The cross scale feature fusion module 141 is configured for aggregates information across different spatial resolutions. The outputs of the four branches are passed to the cross scale feature fusion module 141, which effectively combines features from the multiple scales. In the cross scale feature fusion module 141, given feature maps from four scales with different spatial dimensions and channel numbers, fusion involves up sampling of all feature maps to a standard scale. Standard feature maps are passed through batch normalization (BN) and ReLU activation before concatenation.

Among other things, an average pooling layer 143 is applied to the concatenated feature map, which reduces spatial dimensions. A SoftMax activation is applied to generate attention weights for each scale. All standard feature maps are multiplied by their respective attention weights before final concatenation. A final convolutional layer is applied as a fusion layer to convert the feature map into a fused output representation. Batch normalization (BN) and ReLU activations are then applied before passing the fused feature map for further processing. The cross scale feature fusion module 141 therefore dynamically aggregates information across multiple resolutions, providing a more holistic and context-aware understanding of remote sensing imagery than a single-scale feature path. The components of the architecture 121 work collectively to extract abundant, complementary information from feature maps, ultimately constructing deep feature representations for a final layer 144, and output classes 146.

In summary, the stem module represented by the input layer 122, the convolution stage 123, the batch normalization stage 124, and the rectified linear unit stage 125 generates an initial high-dimensional representation from RGB input images. The first branch represented by the adaptive inverted block 126, the adaptive inverted block 127, and the multi-scale channel attention module 128 extracts low-level features and selects informative channels. The second branch represented by the adaptive inverted block 129, the adaptive inverted block 130, the lightweight dense block 132, and the multi-scale channel attention module 133 captures hierarchical feature representations at a higher semantic level than the first branch. The third branch represented by the adaptive inverted block 134, the adaptive inverted block 135, the adaptive inverted block 136, and the multi-scale channel attention module 137 extracts deeper semantic features at a further reduced spatial scale. The fourth branch continues feature abstraction at a still deeper semantic level through additional adaptive inverted block processing and multi-scale channel attention. The cross scale feature fusion module 141 integrates branch outputs to generate a fused feature representation that is then classified (outputs classes 146) with an Atrous Spatial Pyramid Pooling based classification head.

The architecture 121 can be implemented in remote sensing image classification systems deployed as software modules, cloud-based artificial intelligence services, or integrated hardware-software solutions within remote sensing, geospatial information systems, environmental monitoring systems, agricultural monitoring systems, disaster management systems, climate change and ecosystem analysis platforms, mapping services, and commercial remote sensing and satellite data provider systems. In aerial image and satellite image analysis, the architecture 121 is capable of processing scenes containing multiple objects with differing textures, scales, and contextual arrangements. Examples include classification of crop regions, urban regions, road structures, water bodies, forest areas, land-cover classes, ecosystem boundaries, and disaster-affected zones. By combining multi-scale feature extraction with attention methods in a computationally lightweight structure, the architecture 121 supports improved classification accuracy, improved generalization across diverse datasets, reduced processing time, reduced manual verification requirements, and scalable deployment in large-scale Earth observation, smart agriculture, and disaster management applications.

Figure 1D:
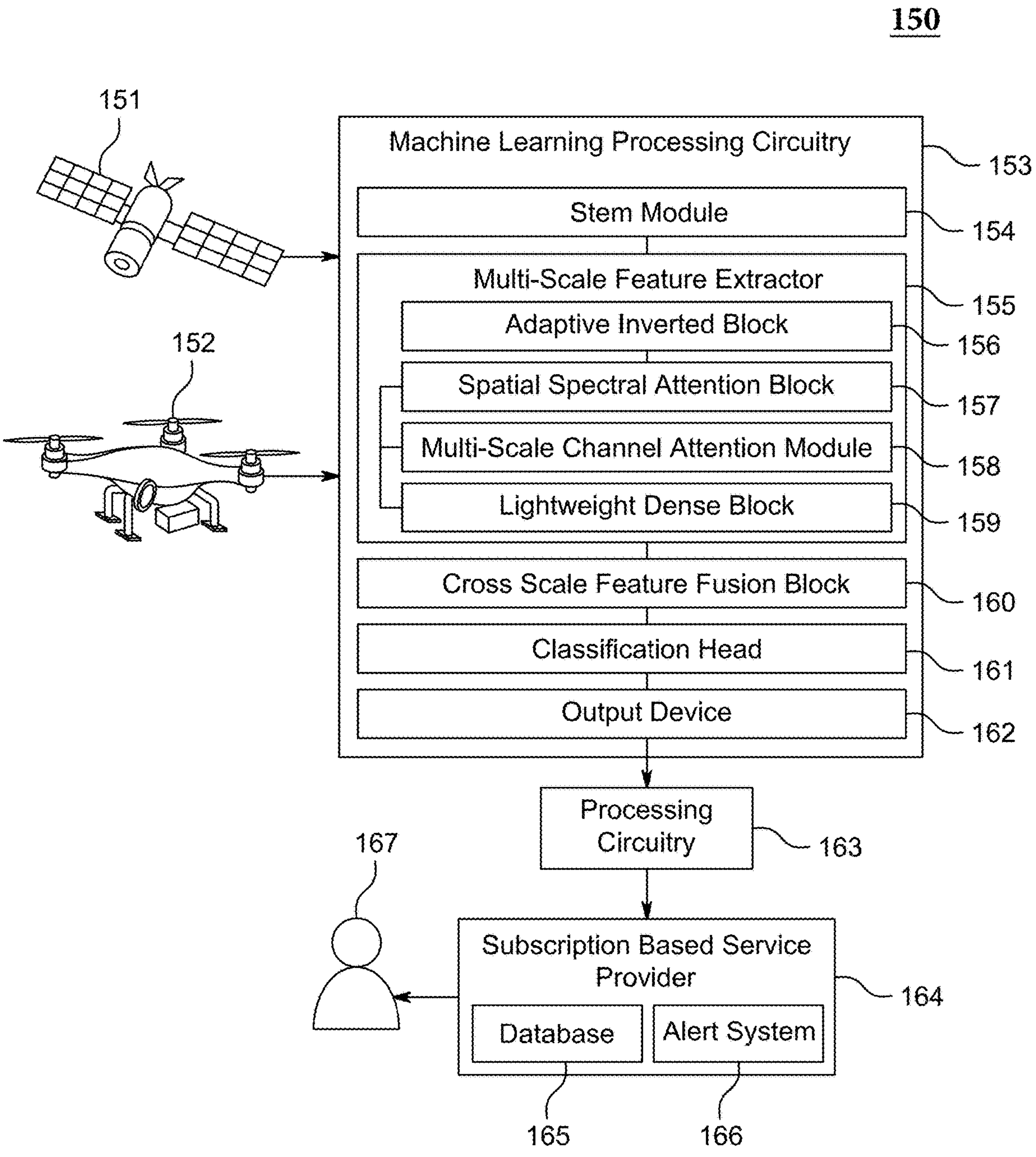
FIG. 1D is a diagram illustrating an operational machine learning processing system configured to process remote sensing imagery and deliver results through a service platform.

FIG. 1D illustrates a system 150 for alerting crop disease or pest infestation. The system 150 is configured to capture red green blue (RGB) images of the Earth using satellite-based and aerial remote imaging devices, process the RGB images through machine learning processing circuitry to generate crop class labels, and transmit alert messages to selected customers when a class label indicates a disease or pest infestation type. The system 150 integrates remote sensing technology with deep learning classification to enable automated agricultural monitoring and early warning capabilities for pest and disease management across growing regions.

The system 150 comprises satellite-based and aerial remote imaging devices to capture RGB images of the Earth and attach Earth location and date information to each RGB image. A imaging satellite 151 represents a satellite-based remote imaging device positioned in orbit above the Earth. The imaging satellite 151 is configured to capture RGB images of the Earth and attach Earth location and date information to each RGB image. The imaging satellite 151 may be implemented using multispectral imaging sensors, hyperspectral cameras, or high-resolution optical systems capable of capturing spectral information across visible wavelength bands. In one example, the imaging satellite 151 operates in low Earth orbit at altitudes ranging from approximately 400 kilometers to approximately 800 kilometers, providing periodic coverage of agricultural regions with spatial resolutions suitable for wide-area crop monitoring applications. The Earth location information attached to each RGB image includes geographic coordinates such as latitude and longitude values derived from orbital parameters and onboard positioning systems. The date information attached to each RGB image includes timestamp data indicating the acquisition time of the image. The time information may be a universal time, such as Coordinated Universal Time (UTC).

The system 150 further includes an aerial remote imaging device 152. The aerial remote imaging device 152 is configured to capture RGB images of the Earth and attach Earth location and date information to each RGB image. In one aspect, the aerial remote imaging device 152 is implemented as an unmanned aerial vehicle (UAV), also referred to as a drone. The aerial remote imaging device 152 operates at lower altitudes compared to the imaging satellite 151, typically ranging from approximately 10 meters to approximately 400 meters above ground level. The lower operating altitude enables the aerial remote imaging device 152 to capture higher spatial resolution imagery suitable for detailed crop inspection, localized pest detection, and disease identification at plant or field scales. The aerial remote imaging device 152 is equipped with global positioning system (GPS) receivers and inertial measurement units for precise georeferencing of captured RGB images. The satellite 151 and the aerial remote imaging device 152 collectively provide complementary coverage capabilities, where the imaging satellite 151 offers broad area monitoring and the aerial remote imaging device 152 provides targeted high-resolution inspection.

The system 150 further comprises machine learning processing circuitry 153. The machine learning processing circuitry 153 receives RGB images captured by the imaging satellite 151 and the aerial remote imaging device 152. The machine learning processing circuitry 153 implements a multi-scale residual attention network (MSRA-Net) architecture configured to convert the RGB images into high-dimensional feature maps and classify the RGB images to generate crop class labels. The machine learning processing circuitry 153 comprises a stem module 154, a multi-scale feature extractor 155, a cross-scale feature fusion block 160, a classification head 161, and an output device 162. The components of the machine learning processing circuitry 153 work collectively to extract spatial and spectral features from the RGB images across multiple resolutions, fuse the extracted features, and classify the images to identify crop types, pest infestations, and disease conditions.

The stem module 154 converts the RGB images into a high-dimensional feature map. The stem module 154 functions as the first feature extractor by processing RGB input images and converting them into high-dimensional representations for deep network processing. The stem module 154 expands the number of feature channels while reducing spatial resolution to provide a stable basis for subsequent deep feature extraction operations. The stem module 154 comprises a 3×3 convolutional layer followed by batch normalization and rectified linear unit (ReLU) activation. The 3×3 convolutional layer applies a convolution operation with a 3×3 kernel to the input RGB images, extracting initial spatial features. The batch normalization layer normalizes the convolutional output to stabilize training and improve convergence characteristics. The ReLU activation layer introduces non-linearity into the feature representations, enabling the network to learn complex patterns in the remote sensing imagery.

The multi-scale feature extractor 155 includes a number of consecutive branches to learn representations of the high-dimensional feature map at different resolutions and semantic levels iteratively. The multi-scale feature extractor 155 receives the high-dimensional feature map from the stem module 154 and processes the feature map through multiple parallel processing pathways. Each branch of the multi-scale feature extractor 155 operates at a different spatial resolution and semantic abstraction level, enabling the network to capture both fine-grained local features and coarse global contextual information from the RGB images. The iterative learning process across the plurality of consecutive branches progressively refines the feature representations, enhancing the discriminative capability of the network for accurate crop and pest classification.

Each branch includes at least one adaptive inverted block (AIB) 156 and a multi-scale channel attention module 158. The adaptive inverted block 156 is designed to enhance the representational strength of the network while maintaining a balance between expressiveness and computational efficiency. The multi-scale channel attention module 158 dynamically weighs channel importance across different scales using multiple convolution kernel sizes. The combination of adaptive inverted blocks 156 and multi-scale channel attention modules 158 within each branch enables effective feature extraction and selective channel weighting for improved classification performance.

One branch includes a lightweight dense block (LDB) 159 that reuses features across multiple scales. The lightweight dense block 159 is positioned within one of the consecutive branches of the multi-scale feature extractor 155 to enable dense feature connectivity and hierarchical feature reuse. The lightweight dense block 159 captures complementary information from preceding layers through concatenation operations, facilitating efficient gradient flow and feature propagation throughout the network architecture.

Each adaptive inverted block 156 first projects an input feature map of a previous block into a higher-dimensional space, performs depthwise convolution to model spatial dependencies, and then projects back to a desired output dimension. The projection into a higher-dimensional space is accomplished through a 1×1 pointwise convolutional layer that expands the channel dimensions according to an expansion ratio parameter. The depthwise convolution applies a 3×3 convolutional kernel independently to each feature channel, modeling spatial relationships within the feature maps without mixing information across channels. The projection back to the desired output dimension is performed through another 1×1 pointwise convolutional layer that compresses the feature channels to match the target output dimensions. The adaptive inverted block 156 takes the number of input channels, the number of output channels, the stride, and the expansion ratio as configuration parameters. When the expansion ratio is greater than one, the expansion layer is applied before depthwise convolution. When the expansion ratio equals one, the expansion step is bypassed, and the input feature map passes directly to the depthwise convolutional layer. The adaptive configuration enables the block to dynamically adjust its complexity based on the expansion ratio, providing flexibility and computational efficiency.

Each adaptive inverted block 156 includes a spatial spectral attention block 157. The spatial spectral attention block 157 is configured to process spectral and spatial features simultaneously to create a refined and informed feature map. Remote sensing images comprise two types of information: spectral information referring to intrinsic material properties of surface features captured in reflectance across varying wavelength bands, and spatial information describing structural properties of scenes including texture, patterns, and spatial relationships between objects. The spatial spectral attention block 157 processes both spectral and spatial information to generate attention weights that selectively emphasize informative features while suppressing less relevant information. The simultaneous processing of spectral and spatial features enables the creation of a refined and informed feature map that captures both material characteristics and structural context from the remote sensing imagery.

In one aspect, the spatial spectral attention block 157 takes a feature map of an associated adaptive inverted block 156 and applies max and average pooling simultaneously to obtain respective feature maps. The spatial spectral attention block 157 receives the feature map output from the adaptive inverted block 156 as input. Adaptive average pooling reduces the spatial dimensions to 1×1 by computing the average value across all spatial locations for each channel. Adaptive max pooling generates a 1×1 feature map by extracting the maximum value across all spatial locations for each channel. The simultaneous application of max and average pooling captures complementary statistical information from the feature map, where the average pooling captures global context and the max pooling captures the most prominent activations.

In one aspect, the respective feature maps are passed to their corresponding 1×1 convolutional layers, which create a bottleneck and reduce feature channels by a factor of 16. The bottleneck configuration compresses the channel dimensions to reduce computational complexity while preserving essential feature information. A resultant reduced feature map is passed through ReLU activation, which follows a 1×1 convolutional layer to restore original dimensions to processed feature maps. The ReLU activation introduces non-linearity after the dimensionality reduction, and the subsequent 1×1 convolutional layer expands the feature channels back to the original dimensions. The processed feature maps are passed to an additional layer to generate a fused feature map. A sigmoid activation function is applied on the fused feature map to generate attention weights that are multiplied with the original input channels to create a spectrally informed feature map. The sigmoid activation constrains the attention weights to values between zero and one, enabling selective weighting of input channels based on their spectral importance. The element-wise multiplication of attention weights with original input channels produces the spectrally informed feature map that emphasizes spectrally relevant features.

In one aspect, the spectrally informed feature map is passed through spatial attention, where a mean and a max of the feature map are computed simultaneously. The spatial attention operation processes the spectrally informed feature map to incorporate spatial context information. The mean operation computes the average activation across all channels at each spatial location, capturing overall activation patterns. The max operation extracts the maximum activation across all channels at each spatial location, identifying the most prominent features. The mean and the max feature maps are aggregated along channel dimension and pass through a 7×7 convolutional layer followed by batch norm to create a single feature map. The aggregation concatenates the mean and max feature maps along the channel dimension, creating a two-channel representation that captures complementary spatial statistics. The 7×7 convolutional layer processes the aggregated feature map to learn spatial attention patterns across a receptive field of 7×7 pixels. The batch normalization stabilizes the spatial attention computation. A sigmoid activation function is applied to generate spatial attention weights, which are then multiplied with the spectrally informed feature map to add spatial information to the feature map. The spatial attention weights range between zero and one, enabling selective emphasis of spatially important regions in the feature map.

In one aspect, the output of the spatial spectral block 157 is added to the original feature map that passed to the AIB 156, forming a residual connection when input dimensions are equal to the output dimensions and stride is equal to 1. The residual connection enables gradient flow through the network during training and allows the adaptive inverted block 156 to learn residual mappings rather than complete transformations. When the input dimensions match the output dimensions and the stride parameter equals one, the shortcut connection directly adds the input feature map to the output of the spatial spectral attention block 157. When the dimensions differ or the stride exceeds one, the residual connection is omitted, and the output of the spatial spectral attention block 157 serves as the final output of the adaptive inverted block 156.

In one aspect, the multi-scale feature extractor 155 includes a first branch having two adaptive inverted blocks 156 followed by a first respective multi-scale channel attention module 158 to extract low-level features and select informative channels. The first branch receives the high-dimensional feature map from the stem module 154 and processes the feature map through two consecutive adaptive inverted blocks 156. The first adaptive inverted block 156 in the first branch has an expansion ratio of 6 and a stride of 2, reducing the spatial dimensions while expanding the channel representations. The second adaptive inverted block 156 in the first branch has an expansion ratio of 6 and a stride of 1, maintaining the spatial dimensions and forming a residual connection. The first respective multi-scale channel attention module 158 processes the output of the two adaptive inverted blocks 156 to extract low-level features and select informative channels through attention-based channel weighting.

The multi-scale feature extractor 155 further includes a second branch having two adaptive inverted blocks 156, a lightweight dense block 159, and a second respective multi-scale channel attention module 158, to extract second features and select informative channels higher than the first branch. The second branch receives the output of the first branch and processes the feature map through two adaptive inverted blocks 156, where the first adaptive inverted block 156 has a stride of 2 for spatial downsampling and the second adaptive inverted block 156 has a stride of 1. The lightweight dense block 159 in the second branch has a growth rate of 32 and comprises 3 layers, enabling dense feature connectivity and hierarchical feature reuse. The second respective multi-scale channel attention module 158 processes the output of the lightweight dense block 159 to extract second features at a resolution and semantic level higher than the first branch.

The multi-scale feature extractor 155 further includes a third branch having three adaptive inverted blocks 156 followed by a third respective multi-scale channel attention module 158, to extract third features and select informative channels higher than the second branch. The third branch receives the output of the second branch and processes the feature map through three consecutive adaptive inverted blocks 156. The first adaptive inverted block 156 in the third branch has a stride of 2 for spatial downsampling, while the second and third adaptive inverted blocks 156 each have a stride of 1 for residual learning. The third respective multi-scale channel attention module 158 processes the output of the three adaptive inverted blocks 156 to extract third features at a resolution and semantic level higher than the second branch.

The multi-scale feature extractor 155 further includes a fourth branch having two adaptive inverted blocks 156 followed by a fourth respective multi-scale channel attention module 158, to extract fourth features and select informative channels higher than the third branch. The fourth branch receives the output of the third branch and processes the feature map through two adaptive inverted blocks 156. The first adaptive inverted block 156 in the fourth branch has a stride of 2 for final spatial downsampling, while the second adaptive inverted block 156 has a stride of 1. The fourth respective multi-scale channel attention module 158 processes the output of the two adaptive inverted blocks 156 to extract features at the highest resolution and semantic level among all branches. The four branches collectively form the plurality of consecutive branches that learn representations at different resolutions and semantic levels iteratively.

In one aspect, the lightweight dense block 159 is configured to capture hierarchical feature representations at different abstraction levels within the same spatial scale. The lightweight dense block 159 enables the model to learn both complex patterns and fine-grained details progressively through dense layer connections. The hierarchical feature representations at different abstraction levels capture varying degrees of semantic information, from low-level edge and texture features to high-level object and scene features, all within the same spatial resolution maintained by the lightweight dense block 159.

In one aspect, the lightweight dense block 159 is configured with three dense layers. Each dense layer comprises sublayers including batch normalization, ReLU activation, and convolutional operations. The first dense layer has a kernel size of 1×1, while the second kernel size is 3×3. The first set of sublayers in each dense layer applies batch normalization and ReLU activation followed by a 1×1 convolutional layer that reduces the channel dimensions. The second set of sublayers applies batch normalization and ReLU activation followed by a 3×3 convolutional layer that processes spatial features while maintaining the reduced channel dimensions.

In one aspect, output of a first dense layer is concatenated with the original input and passed to a second dense layer, where all operations repeat themselves. The concatenation operation combines the feature maps from the first dense layer output and the original input along the channel dimension, creating an enriched feature representation that includes both the original features and the newly learned features. Output of the second dense layer is concatenated with the output of the first dense layer and the original input and passed to a third dense layer. The progressive concatenation accumulates feature information from all preceding processing stages. After passing through the same sequence of operations, a resultant feature map is concatenated with the original input, the output of the first dense layer, and the output of the second dense layer to create a final feature representation. The final feature representation combines information from all three dense layers and the original input, enabling comprehensive feature reuse across all abstraction levels within the lightweight dense block 159.

In one aspect, the multi-scale channel attention module 158 dynamically weighs channel importance across different scales using multiple convolution kernel sizes. The multi-scale channel attention module 158 receives the feature map output from the preceding adaptive inverted blocks 156 or lightweight dense block 159. The input feature map is first passed through an average pooling layer that reduces the spatial dimensions to 1×1, capturing global context information for each channel. Three parallel convolutional layers are employed with different kernel sizes, including 1×1, 3×3, and 5×5, to capture channel relationships at multiple receptive field scales. The resultant feature maps from the three parallel convolutional layers are compressed channel-wise by a ratio of 16 before being concatenated along the channel dimension. The concatenated feature map is passed through a 1×1 convolutional layer that restores the original number of channels. A sigmoid activation is applied to generate attention weights. The attention weights are multiplied by the original input tensor to generate a weighted feature map that emphasizes informative channels across different scales.

The machine learning processing circuitry 153 further comprises a cross-scale feature fusion block 160 configured to dynamically integrate information across multiple different spatial resolutions from the plurality of branches to obtain a fused feature map. The cross-scale feature fusion block 160 receives the output feature maps from all four branches of the multi-scale feature extractor 155. Given feature maps from four scales with different spatial dimensions and channel numbers, the fusion process involves upsampling all feature maps to a common standard scale. The standard feature maps are passed through batch normalization and ReLU activation layers before concatenation. An average pooling layer is applied to the concatenated feature map, reducing the spatial dimensions. A softmax activation is applied to generate attention weights for each scale, enabling dynamic weighting based on the relative importance of features at different resolutions. All standard feature maps are multiplied by their respective attention weights before final concatenation. A final 1×1 convolutional layer is applied as a fusion layer, followed by batch normalization and ReLU activation. The dynamic integration across multiple different spatial resolutions enables the cross-scale feature fusion block 160 to combine fine-grained local features from higher resolution branches with coarse global context from lower resolution branches, producing a fused feature map that captures comprehensive information for classification.

The machine learning processing circuitry 153 further comprises a classification head 161 configured to classify the RGB images by processing the fused feature map through parallel branches. The classification head 161 implements an atrous spatial pyramid pooling (ASPP) architecture that receives the fused feature map from the cross-scale feature fusion block 160. The plurality of parallel branches in the classification head 161 comprises four branches with different processing configurations. A first branch comprises a 1×1 pointwise convolutional layer followed by batch normalization and ReLU activation. A second branch comprises a 3×3 dilated convolutional layer with a dilation rate of 6, followed by batch normalization and ReLU activation. A third branch comprises a 3×3 dilated convolutional layer with a dilation rate of 12, followed by batch normalization and ReLU activation. A fourth branch applies adaptive average pooling, followed by a 1×1 pointwise convolutional layer, batch normalization, ReLU activation, and upsampling to match the spatial dimensions of other branch outputs. An output of all the parallel branches is concatenated and passed through a 1×1 convolutional layer. The concatenation combines the multi-scale contextual information captured by the different dilation rates and pooling operations. A further concatenated feature map is passed through a series of final layers to generate a final classification. The series of final layers comprises average pooling and max pooling applied simultaneously, followed by concatenation, linear layers, ReLU activation layers, and dropout layers arranged in sequence to produce the final classification output.

The machine learning processing circuitry 153 further comprises an output device 162 configured to output a crop class label for a final concatenated image for each of the RGB images. The output device 162 receives the classification output from the classification head 161 and generates crop class labels that identify the content of the classified RGB images. The crop class labels include categories for different crop types, healthy vegetation conditions, pest infestation types, and disease conditions. The output device 162 outputs the crop class label in association with the corresponding RGB image, enabling downstream processing components to associate classification results with the original image data including Earth location and date information.

The system 150 further comprises processing circuitry 163 configured to organize the RGB images labeled with crop class label by the location and the date. The processing circuitry 163 receives the RGB images with associated crop class labels from the output device 162 of the machine learning processing circuitry 153. The processing circuitry 163 organizes the labeled RGB images by extracting the Earth location information and date information attached to each RGB image and indexing the images accordingly. The organization by location enables spatial grouping of classification results for geographic analysis and regional pest monitoring. The organization by date enables temporal tracking of classification results for trend analysis and historical comparison. The processing circuitry 163 is further configured to transmit RGB images, together with class label, location and date to the subscription-based service provider 164 when the class label is for a pest or disease infestation type. The processing circuitry 163 filters the classified images based on the crop class label, identifying images where the classification indicates a pest or disease infestation. When a pest or disease infestation type is detected, the processing circuitry 163 packages the RGB image together with the class label, location information, and date information for transmission to the subscription-based service provider 164.

The system 150 further comprises a subscription-based service provider 164 including a database system 165 configured to maintain customer account information including a growing region, and an alert system 166 configured to send out alert messages to selected customers. The subscription-based service provider 164 operates as a centralized platform for agricultural monitoring services, managing customer subscriptions and delivering pest and disease infestation alerts. The database system 165 stores customer account records that include subscriber identification information, contact information, subscription tier details, and growing region specifications. The growing region information in the database system 165 identifies the geographic areas of interest for each customer, enabling targeted alert delivery based on the location of detected infestations. The growing region may be specified as geographic coordinates, administrative boundaries, farm boundaries, or other spatial definitions that identify the agricultural areas relevant to each customer.

The alert system 166 is configured to send out alert messages to selected customers. The alert system 166 receives infestation data including RGB images, class labels, locations, and dates from the processing circuitry 163. The alert system 166 correlates the location information of detected infestations with the growing region information stored in the database system 165 to identify customers whose growing regions are affected by or proximate to the detected disease or pest infestation. The alert system 166 generates alert messages containing information about the location and the type of disease or pest infestation. The alert messages may be delivered through various communication channels including electronic mail, short message service (SMS), mobile application push notifications, or web-based dashboard notifications.

The subscription-based service provider 164 sends out an alert message to selected customers 167 in a respective growing region to inform of the location and the type of disease or pest infestation. The selected customers 167 are determined based on the correlation between the infestation location and the growing region information maintained in the database system 165. Customers 167 whose growing regions overlap with, are adjacent to, or are within a specified proximity of the detected infestation location are selected for alert notification. The alert message informs the selected customers 167 of the specific location where the pest or disease infestation was detected, enabling the customers to identify the affected area relative to their own growing operations. The alert message further informs the selected customers 167 of the type of disease or pest infestation identified by the classification, enabling the customers to understand the nature of the threat and select appropriate response measures. The alert messages enable timely notification of agricultural stakeholders, supporting early intervention and integrated pest management strategies to minimize crop damage and economic losses.

In operation, the system 150 for alerting crop disease or pest infestation functions as follows. The imaging satellite 151 and the aerial remote imaging device 152 capture RGB images of growing regions and attach Earth location and date information to each captured image. The RGB images are transmitted to the machine learning processing circuitry 153, which processes the images through the stem module 154 to convert them into high-dimensional feature maps. The multi-scale feature extractor 155 processes the high-dimensional feature maps through the plurality of consecutive branches, where each branch includes adaptive inverted blocks 156 with spatial spectral attention blocks 157 and multi-scale channel attention modules 158. One branch further includes the lightweight dense block 159 for hierarchical feature capture and feature reuse. The cross-scale feature fusion block 160 dynamically integrates information from all branches to obtain a fused feature map. The classification head 161 classifies each RGB image by processing the fused feature map through parallel branches and generating a final classification. The output device 162 outputs a crop class label for each classified RGB image. The processing circuitry 163 organizes the labeled images by location and date, and transmits images with pest or disease infestation labels to the subscription-based service provider 164. The subscription-based service provider 164 uses the database system 165 to identify affected customers and the alert system 166 to send alert messages to selected customers 167 in respective growing regions, informing them of the location and type of detected disease or pest infestation.

Figure 2:
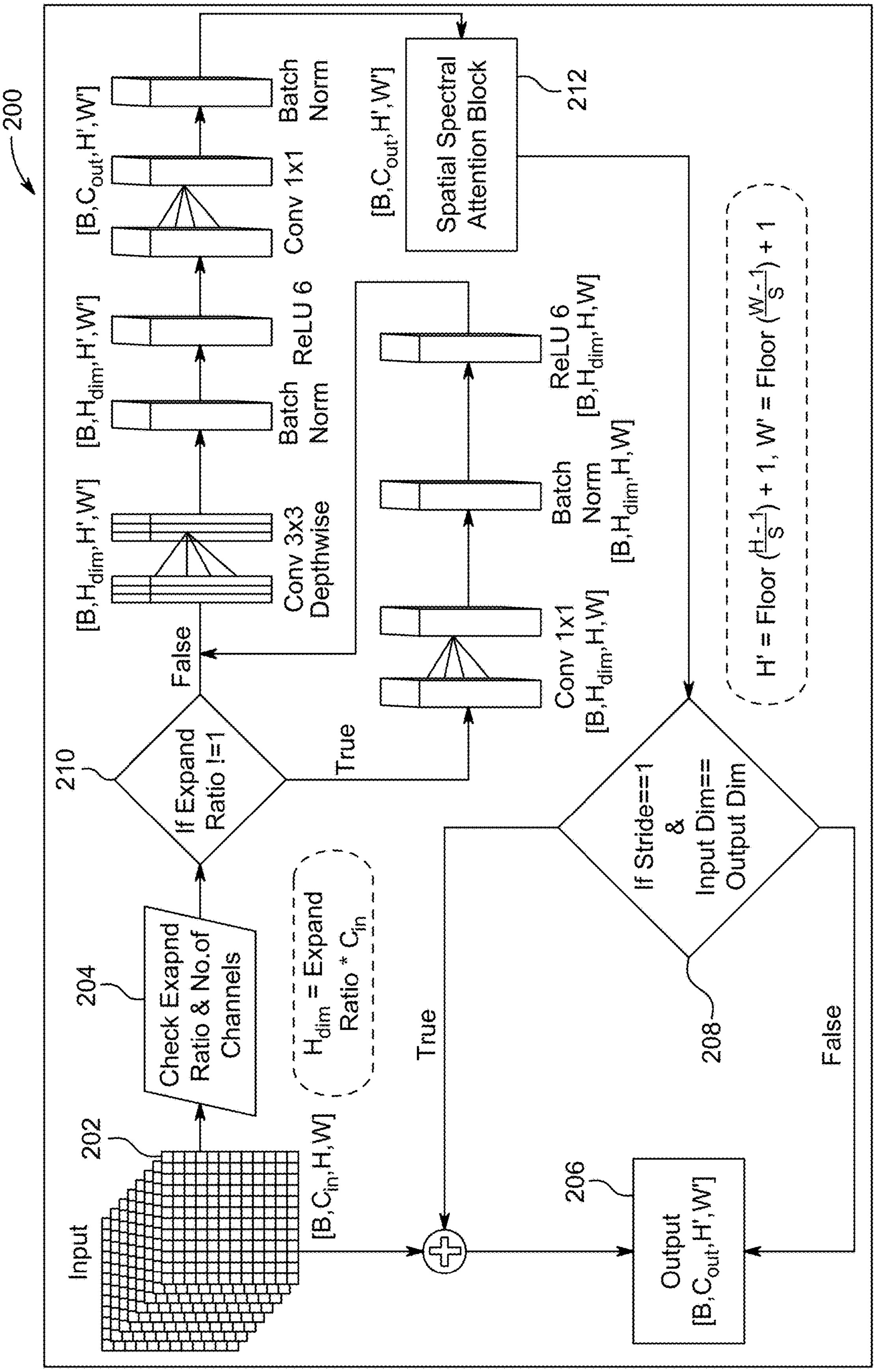
FIG. 2 is an illustration of an adaptive inverted block used for feature transformation within the machine learning architecture.

FIG. 2 illustrates an adaptive inverted block 200. The adaptive inverted block 200 is configured to enhance representational strength of a network while creating a balance between expressiveness and efficiency. The adaptive inverted block 200 implements an inverted bottleneck architecture in which an input feature map is selectively projected into a higher-dimensional space, processed through depthwise convolution to model spatial dependencies, and projected back to a desired output dimension. The adaptive inverted block 200 is used within the remote sensing image classification architecture to process feature maps generated from RGB images and to support learning of representations at different resolutions and semantic levels. In contrast to a traditional bottleneck block that first compresses a representation into a lower-dimensional representation before expansion, the adaptive inverted block 200 first expands channel dimensionality, when expansion is required, before spatial filtering and dimensional projection. The adaptive inverted block 200 can be implemented in a convolutional neural network, a remote sensing scene classification network, a land-use classification system, an environmental monitoring system, an agricultural monitoring system, a disaster assessment platform, or another image processing architecture in which computational efficiency and representation quality are both desired.

The adaptive inverted block 200 includes an input 202, an expand-ratio and channel evaluation stage 204, an output 206, a residual-condition stage 208, an expansion-condition stage 210, and a spatial spectral attention block 212. The input 202 corresponds to an input feature map represented in the figure by tensor dimensions [B, $C_{in}$, H, W], where B denotes batch size, $C_{in}$ denotes an input channel count, and H and W denote dimensions of the input feature map. The input 202 may be received from a stem module, from a previous adaptive inverted block, from a previous branch of a multi-scale feature extractor, or from another feature extraction stage.

The expand-ratio and channel evaluation stage 204 is configured to check expansion ratio and number of input channels $C_{in}$ and to determine a hidden dimension $H_{dim}$ for expanded feature processing. In the configuration depicted in FIG. 2, the hidden dimension is defined as:

$$H_{dim} = \text{expand ratio} \times C_{in}$$

The expansion-condition stage 210 evaluates whether expand ratio is not equal to 1. When expand ratio is greater than 1, the adaptive inverted block 200 applies a 1×1 convolutional layer to the input feature map, followed by batch normalization and a ReLU activation. In the implementation depicted in FIG. 2, the ReLU activation is shown as ReLU 6. The 1×1 convolutional layer expands channel representations from $C_{in}$ into $H_{dim}$, thereby projecting the input feature map into a higher-dimensional space. The resulting expanded tensor is illustrated in the figure by tensor dimensions [B, $H_{dim}$, H, W]. The higher-dimensional representation enables more expressive feature processing prior to spatial filtering. Examples of implementations include configurations in which expand ratio is selected as 2, 4, 6, or another predetermined value based on computational budget, target accuracy, or hardware constraints. In GPU-based or edge-device implementations, expansion ratio may be selected dynamically or statically according to a desired tradeoff between latency and representational capacity.

When expansion ratio is equal to 1, the expansion step can be skipped, and the input feature map is passed directly to a 3×3 depthwise convolutional layer. The configuration shown in FIG. 2 therefore permits the adaptive inverted block 200 to dynamically adapt complexity to the expansion ratio. The 3×3 depthwise convolutional layer processes each feature channel independently, focusing on spatial relationships within features rather than mixing information across channels. The feature map entering the depthwise convolutional layer is denoted as $F_D$. The mathematical formulation of the adaptive inverted block 200 is given by:

$$F_D \begin{cases} \sigma'\left(\oint(W_{1\times1} * F_i)\right) & \text{if } \exp_{ratio} \neq 1 \\ F_i & \text{otherwise} \end{cases} \tag{2}$$

$$F_{A1} = \oint\left(W_{1\times1} * \sigma'\left(\oint(W^d_{3\times3} * F_D)\right)\right) \tag{3}$$

where $F_D$ denotes the input feature map to depthwise convolutional layer, $W_3{\times}_3{}^d$ represents a 3×3 depthwise convolutional layer, $W_1{\times}_1$ represents a 1×1 pointwise convolutional layer, and $F_{A1}$ is the resultant feature map. In the mathematical formulation, I denotes batch normalization and σ' denotes ReLU activation. The adaptive inverted block 200 therefore first projects an input feature map of a previous block into a higher-dimensional space, performs depthwise convolution to model spatial dependencies, and then projects back to a desired output dimension.

Following depthwise convolution, the adaptive inverted block 200 applies batch normalization and ReLU activation to the feature map represented by [B, $H_{dim}$, H', W']. The spatial dimensions after strided spatial processing are represented in the figure.

After activation, the adaptive inverted block 200 applies a 1×1 pointwise convolutional layer followed by batch normalization to compress feature channels from hidden dimension $H_{dim}$ into output dimension $C_{out}$. The figure depicts the compressed output by tensor dimensions [B, $C_{out}$, H', W']. The 1×1 pointwise convolutional layer therefore provides channel mixing and dimensional projection without altering local spatial neighborhoods processed by the depthwise convolutional layer. In various configurations, the 1×1 pointwise convolutional layer may be implemented with learnable kernels optimized during training to preserve informative channels while reducing computational burden associated with wider intermediate representations.

The adaptive inverted block 200 includes a spatial spectral attention block 212. The spatial spectral attention block 212 receives the feature map after pointwise projection and batch normalization and is configured to process spectral and spatial features simultaneously to create a refined and informed feature map. In remote sensing imagery, spectral information refers to intrinsic material properties represented by reflectance responses of surface features, while spatial information refers to texture, structural arrangement, patterns, and spatial relationships between objects or regions within a scene. The spatial spectral attention block 212 therefore refines the projected feature map by incorporating both spectral discrimination and spatial context. The spatial spectral attention block 212 may be configured for aerial image classification, satellite scene interpretation, agricultural crop analysis, land-cover identification, urban scene understanding, climate-change monitoring, or other image analysis tasks in which both material information and scene structure contribute to feature discrimination.

The adaptive inverted block 200 further includes the residual-condition stage 208, which evaluates whether stride is equal to 1 and whether input dimensions are equal to output dimensions. When stride is equal to 1 and input dimensions are equal to output dimensions, the feature map produced by the spatial spectral attention block 212 is added to the original feature map entering the adaptive inverted block 200 through a residual connection. The addition operation is illustrated in FIG. 2 by a summation node receiving the original input feature map and the refined output from the spatial spectral attention block 212. The residual connection allows direct propagation of identity information and supports efficient gradient flow during training. When stride is not equal to 1 or when input dimensions are not equal to output dimensions, the residual connection is not applied, and the feature map output from the spatial spectral attention block 212 is passed directly to the output 206. The residual-condition stage 208 therefore corresponds to a configuration in which output of the spatial spectral block is added to the original feature map that passed to the AIB, forming a residual connection when input dimensions are equal to the output dimensions and stride is equal to 1.

The output 206 corresponds to an output tensor represented in FIG. 2 by [B, $C_{out}$, H', W']. The output 206 may be supplied to a subsequent adaptive inverted block, a multi-scale channel attention module, a lightweight dense block, a cross scale feature fusion stage, or another processing stage within a multi-scale feature extractor. The output 206 therefore preserves a desired output channel dimension while optionally reducing spatial resolution according to stride and while incorporating refined information generated by the spatial spectral attention block 212. Examples of output configurations include feature maps for low-level feature extraction in an earlier branch, feature maps for higher semantic abstraction in a deeper branch, or feature maps for subsequent fusion across multiple scales.

FIG. 2 therefore depicts a complete processing flow for the adaptive inverted block 200 beginning with input 202, evaluating expand ratio and number of channels at stage 204, selectively applying expansion according to stage 210, performing depthwise spatial filtering and pointwise dimensional projection, refining the projected feature map by spatial spectral attention block 212, evaluating residual conditions at stage 208, and generating output 206. The processing sequence illustrated in FIG. 2 is a feature-learning architecture in which computational efficiency, adaptive dimensional expansion, spatial dependency modeling, and simultaneous spectral and spatial refinement are integrated within a single block structure.

Figure 3:
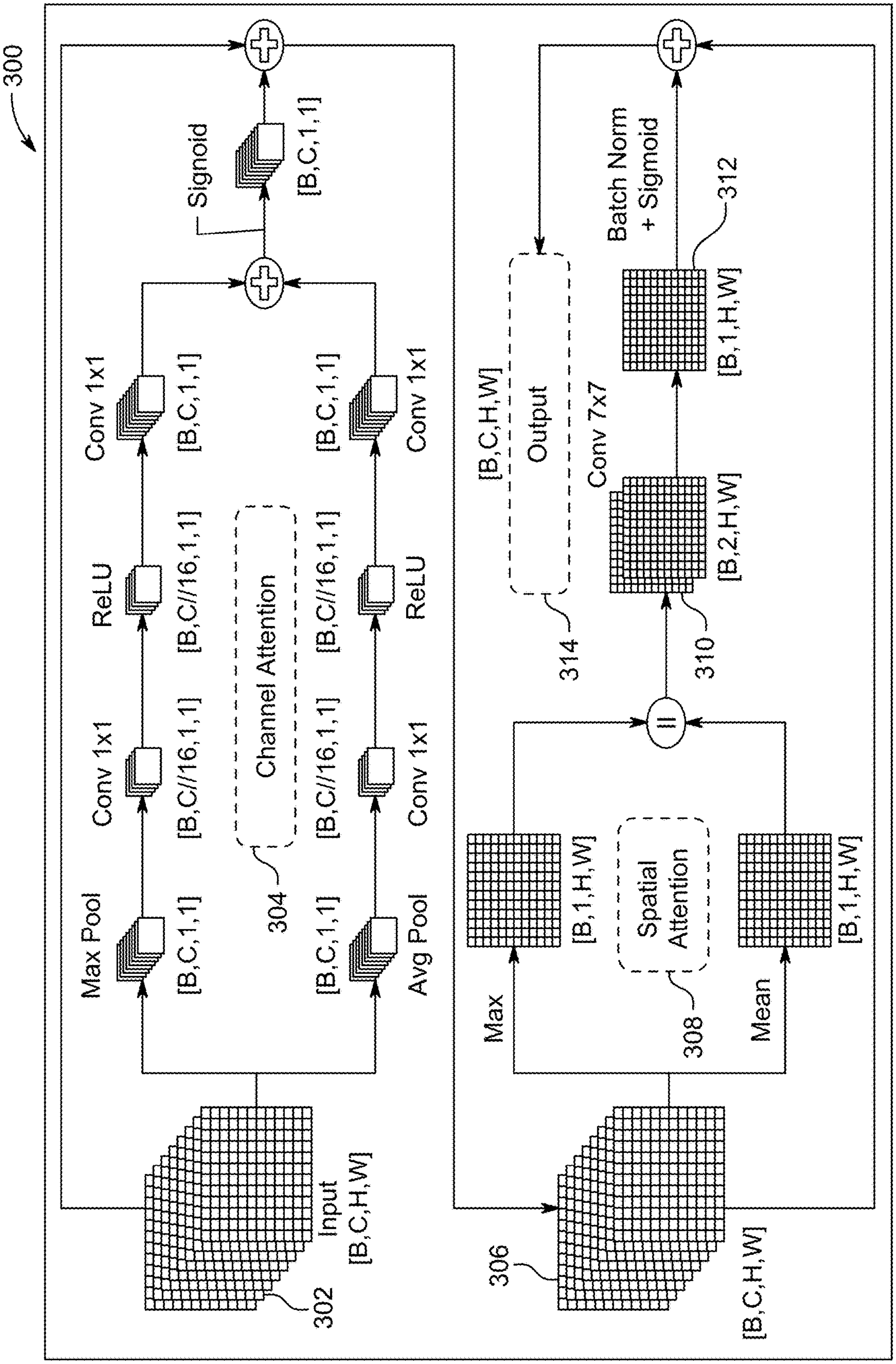
FIG. 3 is an illustration of a spatial spectral attention block configured to refine feature representations.

FIG. 3 illustrates a spatial spectral attention module 300. The spatial spectral attention module 300 is configured to process spectral and spatial features simultaneously to create a refined and informed feature map from an input feature map. The spatial spectral attention module 300 is used in the remote sensing image classification architecture as the remote sensing images contain spectral information and spatial information that together contribute to scene understanding. Spectral information refers to intrinsic material properties of surface features captured in reflectance of varying wavelength bands. Spatial information refers to structural properties of a scene, such as texture, patterns, and spatial relationship between objects. Context from spatial features is used to understand and classify scenes accurately, while material discrimination from spectral features is also used for feature discrimination. The spatial spectral attention module 300 therefore combines spectral processing and spatial processing in a unified attention structure to refine feature representations received from a preceding processing stage, such as an adaptive inverted block.

The spatial spectral attention module 300 includes an input 302, a channel attention stage 304, a spectrally informed feature map 306, a spatial attention stage 308, an aggregated feature map 310, a convolution and normalization stage 312, and an output 314. The input 302 corresponds to an input feature map represented in FIG. 3 by tensor dimensions [B, C, H, W], where B denotes batch size, C denotes a channel dimension, and H and W denote spatial dimensions. The input 302 may be a feature map of an associated adaptive inverted block. The input 302 is provided to the channel attention stage 304, which performs spectral attention processing, and the resulting spectrally informed feature map 306 is provided to the spatial attention stage 308 for spatial refinement. The output 314 corresponds to a final spatial spectral informed feature map represented in FIG. 3 by tensor dimensions [B, C, H, W]. The output 314 may be supplied to a subsequent adaptive inverted block, a multi-scale channel attention module, a lightweight dense block, a cross scale feature fusion block, or another feature processing stage.

The channel attention stage 304 takes the input feature map 302 and applies max and average pooling simultaneously to obtain respective feature maps. In the implementation illustrated in FIG. 3, adaptive average pooling reduces spatial dimensions to 1×1 by computing an average across spatial dimensions, thereby generating an average pooled feature map represented by [B, C, 1, 1]. Adaptive max pooling is used to generate a 1×1 feature map by extracting maximum values, thereby generating a max pooled feature map represented by [B, C, 1, 1]. The average pooled feature map and the max pooled feature map are then passed to corresponding 1×1 convolutional layers, which create a bottleneck and reduce feature channels by a factor of 16. As depicted in FIG. 3, each reduced feature map is represented by [B, C, 1, 1]. The resultant reduced feature map is passed through ReLU activation, and a subsequent 1×1 convolutional layer restores original dimensions to processed feature maps, thereby returning each branch to [B, C, 1, 1]. The processed feature maps are passed to an additional fusion stage in which the processed average branch and the processed max branch are combined. A sigmoid activation function is applied on the fused feature map to generate attention weights represented in FIG. 3 by [B, C, 1, 1]. The attention weights are multiplied with original input channels to create the spectrally informed feature map 306, represented by [B, C, H, W].

The spectral processing performed by the channel attention stage 304 is mathematically defined as follows:

$$F_{\ltimes} = F_{A1} \otimes (\psi(F_{\Cap} + F_{\Cup})) \tag{4}$$

$$F_{\Cap} = W_{1\times 1} * (\sigma(W'_{1\times 1} * \Cap(F_{A1}))) \tag{5}$$

$$F_{\Cap} = W_{1\times 1} * (\sigma(W'_{1\times 1} * \Cup(F_{A1}))) \tag{6}$$

where $\Cap$ denotes an average pooling operation and $\Cup$ represents a max pooling operation. The variables $W_1\times_1$ and $W_{(1}\times_{1)}$' represent weights of two convolutional layers. The notation σ represents ReLU activation and w represents a sigmoid activation layer. $F\Cap$ represents an average pooled feature map, $F\Cup$ represents a max pooled feature map, ⊗ represents element wise multiplication, and FX represents the spectrally informed feature map. The spectrally informed feature map therefore corresponds to a feature representation in which channel responses are weighted according to information extracted from both average pooled and max pooled spectral descriptors.

The spectrally informed feature map 306 is then passed through the spatial attention stage 308. The spatial attention stage 308 is configured to compute mean and max of the feature map simultaneously. In the implementation illustrated in FIG. 3, a mean feature map and a max feature map are each generated with tensor dimensions [B, 1, H, W]. The resultant feature maps capture overall activation and max activation across all spatial locations, respectively. The mean feature map and the max feature map are aggregated along channel dimension to form the aggregated feature map 310, which is represented in FIG. 3 by [B, 2, H, W]. The aggregated feature map 310 therefore provides a spatial descriptor that combines average response and strongest response information across the spatial field of the spectrally informed feature map 306. Examples of spatial patterns represented at the spatial attention stage 308 include elongated agricultural field structures, clustered urban features, irregular vegetation textures, water body boundaries, road-like formations, and other scene structures captured in aerial or satellite imagery.

The aggregated feature map 310 is passed to the convolution and normalization stage 312. The convolution and normalization stage 312 applies a 7×7 convolutional layer followed by batch norm to create a single feature map represented in FIG. 3 by [B, 1, H, W]. After batch norm, a sigmoid activation function is applied to generate spatial attention weights. The spatial attention weights are multiplied with the spectrally informed feature map 306 to add spatial information to the feature map and thereby generate the output 314. The spatial processing performed after generation of the spectrally informed feature map is mathematically defined as follows:

$$F_{\ltimes} = F_{A1} \otimes \psi\left(\oint\left(W_{7\times 7} * \left[\preccurlyeq\left(F_{\ltimes}\right) \| \succcurlyeq\left(F_{\ltimes}\right)\right]\right)\right) \tag{7}$$

where ≤ and ≥ represent mean and max operations respectively, ‖ represents concatenation, and F×| represents a final spatial spectral informed feature map. In the mathematical formulation, ϕ denotes batch norm. The output 314 therefore corresponds to a refined feature representation in which spectral attention and spatial attention have both been incorporated. The output 314 of the spatial spectral attention module 300 is then added to the original feature map that passed to the adaptive inverted block, thereby forming a residual connection when input dimensions are equal to output dimensions and stride is equal to 1. Otherwise, output of the spatial spectral attention module 300 is considered as final output of the respective adaptive inverted block. The residual behavior associated with the spatial spectral attention module 300 is mathematically represented as follows:

$$F_{Aout} = \begin{cases} F_i + F_{\ltimes} & \text{if } D_{in} = D_{out} \ \& \ S = 1 \\ F_{\ltimes} & \text{otherwise} \end{cases} \tag{8}$$

where $F_i$ denotes the original feature map that passed to the adaptive inverted block, Din denotes input dimensions, $D_{out}$ denotes output dimensions, and S denotes stride. In the configuration described in the disclosure, S=1 indicates that two adaptive inverted blocks are incorporated one after the other. A first adaptive inverted block expands a feature map from 32 channels to 64 channels and reduces spatial dimensions from 112×112 to 56×56. The first adaptive inverted block has an expanded ratio of 6 and a stride of 2, making the first adaptive inverted block a simple inverted block without residual connection. A second adaptive inverted block has a stride of one and therefore acts as a residual inverted block. Feature dimensions remain the same in the second adaptive inverted block.

The channel attention stage 304, the spatial attention stage 308, the aggregated feature map 310, the convolution and normalization stage 312, and the output 314 can be implemented in a variety of configurations consistent with the processing sequence shown in FIG. 3. The pooling operations can be implemented as adaptive pooling operations that reduce feature maps of varying spatial sizes to fixed descriptors for channel attention processing. The 1× 1 convolutional layers can be implemented as channel-reduction and channel-restoration layers that form a bottleneck for compact representation learning. The 7× 7 convolutional layer can be implemented as a spatial filtering layer configured to capture spatial context from the concatenated mean and max feature maps. Batch norm can be implemented as a normalization layer configured to stabilize intermediate activations prior to generation of spatial attention weights. The sigmoid activation functions can be implemented as nonlinear gating functions for generation of spectral attention weights and spatial attention weights. The element wise multiplication stages can be implemented as feature reweighting operations applied channel-wise and spatially. The spatial spectral attention module 300 can therefore be configured in machine learning processing circuitry executing on one or more processors, graphics processing units, digital signal processors, application-specific integrated circuits, field-programmable gate arrays, system-on-chip architectures, or cloud-based neural network accelerators for processing remote sensing imagery at different scales and complexities.

FIG. 3 therefore depicts a complete processing architecture for the spatial spectral attention module 300 beginning with the input 302, generating spectral descriptors through simultaneous max pooling and average pooling in the channel attention stage 304, generating the spectrally informed feature map 306 through attention weighting of original input channels, generating spatial descriptors through simultaneous mean and max operations in the spatial attention stage 308, aggregating the spatial descriptors in the aggregated feature map 310, applying 7×7 convolution and batch norm in the convolution and normalization stage 312, and generating the output 314 as a final spatial spectral informed feature map. The spatial spectral attention module 300 therefore supports parallel processing in which spectral and spatial features are simultaneously aggregated to create a refined and informed feature map for subsequent remote sensing image classification.

Figure 4:
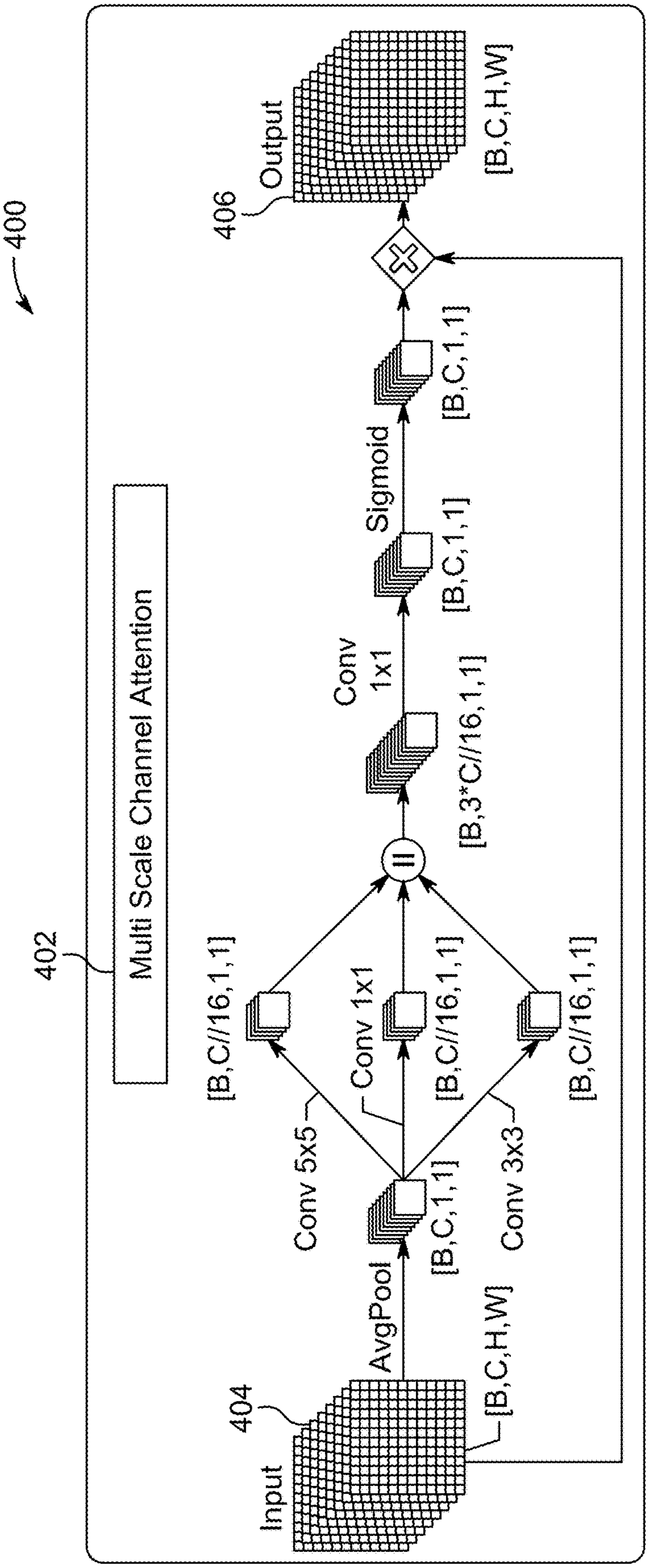
FIG. 4 is an illustration of a multi-scale channel attention module configured to enhance feature extraction across multiple receptive fields.

FIG. 4 illustrates a multi-scale channel attention block 400. The multi-scale channel attention block 400, also referred as to the MSCA block 400, is configured to dynamically weight channel importance across different scales using multiple convolution kernel sizes. The multi-scale channel attention block 400 processes an input feature map by first reducing spatial dimensions through average pooling, then extracting channel responses through a number of parallel convolutional operations with different kernel sizes, and then generating channel attention weights that are multiplied with the original input tensor to generate a weighted feature map. The multi-scale channel attention block 400 is implemented within a multi-scale feature extractor to improve feature learning by emphasizing informative channels across multiple scales. The multi-scale channel attention block 400 can be implemented in a remote sensing image classification architecture, a scene classification network, a land-use analysis system, an environmental monitoring platform, an agricultural monitoring system, a disaster assessment system, or another image processing architecture in which feature channels corresponding to different spatial scales are weighted for classification.

The multi-scale channel attention block 400 includes a multi-scale channel attention (MSCA) stage 402, an input 404, and an output 406. The input 404 corresponds to an input feature map represented in FIG. 4 by tensor dimensions [B, C, H, W], where B denotes batch size, C denotes number of channels, and H and W denote spatial dimensions. The input 404 may be received from an adaptive inverted block, from a preceding branch of a multi-scale feature extractor, or from another feature processing stage. In the configuration illustrated in FIG. 4, the input 404 is first passed through an average pooling layer. The average pooling layer reduces the spatial dimensions to 1×1, generating an intermediate feature map represented by tensor dimensions [B, C, 1, 1]. The average pooling operation therefore aggregates channel responses across spatial locations and forms a compact descriptor of channel content for subsequent channel attention processing.

The multi-scale channel attention stage 402 applies three parallel convolutional layers to the intermediate feature map generated by average pooling. The three parallel convolutional layers include a convolutional layer with a kernel size of 1×1, a convolutional layer with a kernel size of 3×3, and a convolutional layer with a kernel size of 5×5. The use of multiple convolution kernel sizes allows the multi-scale channel attention block 400 to dynamically weight channel importance across different scales using multiple convolution kernel sizes. The convolutional layer with a kernel size of 1×1 captures local channel interactions with minimal receptive field expansion. The convolutional layer with a kernel size of 3×3 captures channel responses corresponding to a broader local neighborhood. The convolutional layer with a kernel size of 5×5 captures channel responses corresponding to a larger contextual neighborhood. In examples of implementation, the three convolutional layers may operate in parallel on the pooled feature descriptor to provide multiple scale-specific channel representations for remote sensing scenes containing objects, textures, and structures that vary in scale. The resultant feature maps are compressed channel-wise by a ratio of 16, as illustrated in FIG. 4 by tensor dimensions [B, C/16, 1, 1] for each branch.

The three compressed feature maps generated by the 1×1, 3×3, and 5×5 convolutional layers are concatenated along the channel dimension. In FIG. 4, the concatenated feature map is represented by tensor dimensions [B, 3*C/16, 1, 1]. The concatenation operation combines the scale-specific channel descriptors into a unified multi-scale representation. The concatenated feature map is then passed through a 1×1 convolutional layer that restores the original number of channels. In FIG. 4, the restored feature map is represented by tensor dimensions [B, C, 1, 1]. A sigmoid activation is then applied to generate attention weights, also represented in FIG. 4 by tensor dimensions [B, C, 1, 1]. The attention weights correspond to channel-wise weighting coefficients derived from the multi-scale representation. The attention weights are multiplied by the original input tensor to generate a weighted feature map, and the weighted feature map corresponds to the output 406 represented by tensor dimensions [B, C, H, W]. The multiplication operation therefore reweights the original feature channels according to channel importance learned across the plurality of convolution kernel sizes.

The mathematical formulation of the multi-scale channel attention block 400 is given as follows:

$$F_{MSCA} = F_{Aout} \otimes \psi(W_{1\times1} * F_c) \tag{9}$$

$$F_c = [W_{1\times1} * F_\circ \| W_{3\times3} * F_\circ \| W_{5\times5} * F_\circ] \tag{10}$$

$$F_\circ = \Cap(F_{Aout}) \tag{11}$$

where W (1×1), W (3×3), and W (5×5, denote the weights of convolutional layers, F° and Fc denote intermediate feature maps, and $F_{MSCA}$ is the output feature map of the MSCA block. In the mathematical formulation, Λ denotes average pooling and ψ denotes sigmoid activation. The symbol ⊗ denotes element-wise multiplication and the symbol || denotes concatenation. Equation 11 corresponds to generation of the pooled channel descriptor from the input feature map $F_{Aout}$. Equation 10 corresponds to generation of the concatenated multi-scale feature representation through the plurality of convolutional layers having different kernel sizes. Equation 9 corresponds to generation of the output feature map by multiplying the original input feature map with attention weights obtained from the concatenated multi-scale representation.

The input 404 can correspond to a feature map received from an adaptive inverted block within a first branch of a multi-scale feature extractor. In the arrangement described in the disclosure, the output of the multi-scale channel attention block 400 is the final output of branch one. The feature map output from branch one is then passed to branch two which is consist of two Adaptive Inverted Bottleneck (AIB) blocks, a lightweight dense block and a MSCA block connected in a sequential manner. A first AIB module in branch two is a simple block with stride of 2 and expand ratio of 6 that transforms the feature map from [B, 64, 56, 56] to [B, 128, 28, 28]. In the tensor notation, B denotes batch size, 64 and 128 presented number of channels, and 56×56 and 28×28 represent spatial dimensions. A next AIB block is a residual block that keeps the feature dimensions same as before. Later on, a lightweight dense block with 3 layers and growth rate of 32 is incorporated. The multi-scale channel attention block 400 shown in FIG. 4 can therefore be positioned at an end of branch one as a channel weighting stage and can also be incorporated after additional feature learning stages in branch two.

The multi-scale channel attention stage 402 can be implemented in a variety of configurations consistent with the disclosure. In one configuration, the average pooling layer computes a channel descriptor for each channel by averaging all spatial values in the corresponding feature map. In another configuration, the convolutional layers can be trained to respond to different receptive field patterns associated with fine objects, medium-scale objects, and coarse scene structures found in aerial and satellite imagery. In remote sensing examples, fine-scale objects may include roads, rooftops, field boundaries, or small water channels, whereas larger contextual regions may include crop parcels, forested regions, urban blocks, or terrain formations. The output 406 therefore corresponds to a channel-weighted feature representation in which channels useful for discriminating remote sensing scenes are emphasized relative to channels carrying less useful information.

FIG. 4 therefore illustrates a complete processing flow of the multi-scale channel attention block 400 beginning with input 404, reducing the input feature map through average pooling, processing the pooled feature map through parallel convolutional layers with kernel sizes of 1×1, 3×3, and 5×5, compressing channel dimensions by a ratio of 16, concatenating the resultant feature maps along the channel dimension, restoring the original number of channels through a 1×1 convolutional layer, applying sigmoid activation to generate attention weights, and multiplying the attention weights with the original input tensor to generate output 406. The multi-scale channel attention block 400 therefore provides dynamic channel weighting across different scales and supports feature selection within a multi-scale feature extractor configured for remote sensing image classification.

Figure 5:
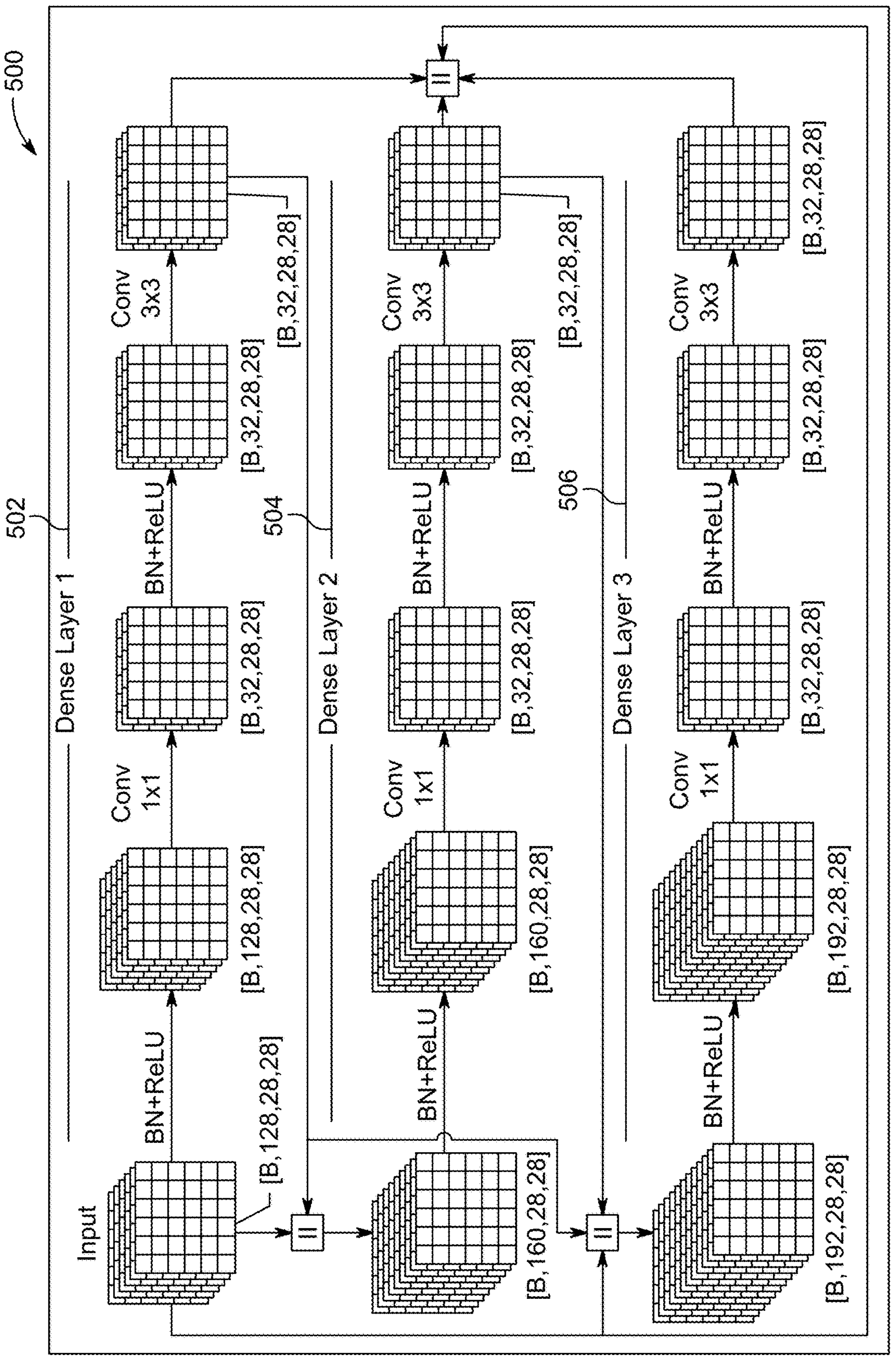
FIG. 5 is an illustration of a lightweight dense block configured to generate hierarchical feature representations.

FIG. 5 illustrates a lightweight dense block 500. The lightweight dense block 500 is configured to capture hierarchical feature representations at different abstraction levels within the same spatial scale. The lightweight dense block 500 enables a model to learn both complex patterns and fine-grained details progressively while preserving spatial dimensions of an input feature map. The lightweight dense block 500 is implemented within a multi-scale feature extraction architecture for remote sensing image classification and is positioned in a branch that receives feature maps from an adaptive inverted block.

The lightweight dense block 500 is composed of three dense layers, shown in FIG. 5 as a first dense layer 502, a second dense layer 504, and a third dense layer 506. Each dense layer consists of an additional 6 sublayers. The additional 6 sublayers include two sets of batch norm, ReLU, and convolutional layers. In the first set, the kernel size of the convolutional layer is kept at 1×1, while in the second set, the kernel size is increased to 3×3. The lightweight dense block 500 therefore implements repeated transformation stages in which channel reduction is followed by spatial feature extraction while maintaining the same spatial scale. The dense connectivity pattern shown in FIG. 5 further allows outputs of preceding dense layers to be reused by later dense layers through concatenation operations, thereby supporting progressive accumulation of feature representations.

The first dense layer 502 receives an input feature map from the adaptive inverted block. In the configuration depicted in FIG. 5, the input feature map is represented by tensor dimensions [B, 128, 28, 28], where B denotes batch size, 128 denotes channel dimension, and 28×28 denotes spatial dimensions. The first dense layer 502 first applies batch normalization and ReLU activation to the input feature map. Batch normalization normalizes intermediate activations to improve feature distribution during training, and ReLU activation introduces nonlinear feature transformation. After batch normalization and ReLU activation, the first dense layer 502 applies a 1×1 convolutional layer, which reduces the channels from 128 to 32 and produces a feature map represented in FIG. 5 by [B, 32, 28, 28]. The 1×1 convolutional layer therefore performs channel compression while preserving spatial dimensions. The first dense layer 502 then applies another set of batch normalization and ReLU activation to the compressed feature map. After the second batch normalization and ReLU activation, the first dense layer 502 applies a 3×3 convolutional layer. The 3×3 convolutional layer extracts local spatial patterns while maintaining the same feature dimensions, thereby generating an output feature map represented by [B, 32, 28, 28].

The output of the first dense layer 502 is concatenated with the original input and passed to the second dense layer 504. The concatenation operation is shown in FIG. 5 by a concatenation node receiving the original input feature map and the output feature map of the first dense layer 502. In the configuration illustrated in FIG. 5, concatenation of the original input feature map [B, 128, 28, 28] and the output feature map of the first dense layer 502 [B, 32, 28, 28] produces an intermediate feature map represented by [B, 160, 28, 28]. The second dense layer 504 receives the concatenated feature map and repeats the same sequence of operations. The second dense layer 504 applies batch normalization and ReLU activation to the concatenated feature map, then applies a 1×1 convolutional layer to reduce channels to 32, producing a feature map represented by [B, 32, 28, 28]. The second dense layer 504 then applies another set of batch normalization and ReLU activation followed by a 3×3 convolutional layer, while preserving feature dimensions at [B, 32, 28, 28]. The second dense layer 504 therefore continues hierarchical feature extraction at the same spatial scale while incorporating both original input information and features generated by the first dense layer 502.

The output of the second dense layer 504 is concatenated with the output of the first dense layer 502 and the original input and passed to the third dense layer 506. The concatenation node shown before the third dense layer 506 therefore aggregates multiple preceding feature maps. In the configuration depicted in FIG. 5, concatenation of the original input feature map [B, 128, 28, 28], the output of the first dense layer 502 [B, 32, 28, 28], and the output of the second dense layer 504 [B, 32, 28, 28] produces an intermediate feature map represented by [B, 192, 28, 28]. The third dense layer 506 receives the concatenated feature map and repeats the same sequence of operations used in the first dense layer 502 and the second dense layer 504. The third dense layer 506 applies batch normalization and ReLU activation, followed by a 1×1 convolutional layer that reduces channels to 32. The third dense layer 506 then applies another set of batch normalization and ReLU activation followed by a 3×3 convolutional layer. The output of the third dense layer 506 is represented by [B, 32, 28, 28]. After passing through the same sequence of operations, a resultant feature map is concatenated with the original input, the output of the first dense layer, and the output of the second dense layer to create a final feature representation. The final concatenation is shown in FIG. 5 by a concatenation node positioned at the right side of the lightweight dense block 500.

The lightweight dense block 500 is mathematically formulated as follows:

$$F_l = H_l([F_0, F_1, F_2, \ldots, F_{l-1}]) \tag{12}$$

where Fl denotes the output of 1st layer, Hl represents the layer transformation function, and $[F_0, F_1, F_2, \ldots, F(1'''-1)]$ represents the concatenation of all the preceding layers. The layer transformation function is defined as:

$$H_l(z) = W_{3\times3} * \sigma\left(\oint\left(W_{1\times1} * \sigma\left(\oint(z)\right)\right)\right) \tag{13}$$

where z represents the input to the lightweight dense block. In equation (13), ϕ denotes batch normalization and σ denotes ReLU activation. The mathematical formulation therefore corresponds to a sequence in which input features are normalized and activated, transformed by a 1×1 convolutional layer, normalized and activated again, and then processed by a 3×3 convolutional layer.

The final channel dimension of the lightweight dense block 500 depends upon the growth factor and number of layers. The final channel dimension is calculated as:

$$C_{out} = C_{in} + (L \times G) \tag{14}$$

where Cout denotes output channel dimension, Cin denotes input channel dimension, L denotes number of layers, and G denotes growth factor. In the configuration depicted in FIG. 5, the lightweight dense block 500 begins with an input channel dimension of 128 and adds 32 channels for each of the three dense layers. The lightweight dense block 500 therefore progressively increases channel dimensionality through concatenation while preserving spatial dimensions at 28×28. Examples of other configurations include implementations with different growth factors, different input channel counts, or different numbers of dense layers, depending on network depth, computational budget, or target classification accuracy.

The lightweight dense block 500 is configured to capture hierarchical feature representations at different abstraction levels within the same spatial scale. The first dense layer 502 may capture relatively local and low-complexity patterns from an input feature map received from an adaptive inverted block. The second dense layer 504 may capture more enriched feature combinations by processing both original input information and output of the first dense layer 502. The third dense layer 506 may capture further abstraction by processing accumulated representations from the original input, the first dense layer 502, and the second dense layer 504. The lightweight dense block 500 therefore supports progressive learning of fine-grained details and more complex patterns while remaining computationally efficient. Illustrative examples of learned features include texture transitions, land-cover boundaries, crop row arrangements, road-edge patterns, built-up region structures, and other spatial characteristics present in remote sensing imagery.

The lightweight dense block 500 further provides enhanced feature reuse with minimal computational overhead. Because the output of a first dense layer is concatenated with the original input and passed to a second dense layer, and because the output of the second dense layer is concatenated with the output of the first dense layer and the original input and passed to a third dense layer, preceding features remain accessible at later stages of processing. The dense connectivity pattern shown in FIG. 5 therefore reduces loss of useful intermediate information and promotes reuse of earlier learned representations. The lightweight dense block 500 may be implemented in hardware or software configurations including central processing units, graphics processing units, tensor processing units, field-programmable gate arrays, neural accelerators, cloud-based inference platforms, and edge processing devices.

The output of the lightweight dense block 500 is passed to the final block of branch 2, known as MSA. The output of second branch is then passed to third branch which consists of three AIB blocks and an MSCA block. The first AIB block is simple, expanding the channel dimension from 224 to 256 and reducing the spatial dimensions from 28×28 to 14×14. The second and third adaptive inverted blocks are residual. After passing through another multi-stage attention block, the feature map enters the last branch, which consists of two AIB blocks and an MSCA. The first adaptive block is non-residual and transforms the feature map from [B, 256, 14, 14] to [B, 512, 7, 7]. The second adaptive inverted block is residual and does not change the feature dimensions.

FIG. 5 therefore depicts the complete processing structure of the lightweight dense block 500, including the first dense layer 502, the second dense layer 504, the third dense layer 506, repeated batch normalization and ReLU activation operations, 1×1 convolutional channel reduction, 3×3 convolutional spatial feature extraction, and concatenation of preceding feature maps to create a final feature representation. The processing flow illustrated in FIG. 5 corresponds to a lightweight dense block configured with three dense layers, wherein the first dense layer has a kernel size of 1×1, while the second kernel size is 3×3, and wherein output of a first dense layer is concatenated with the original input and passed to a second dense layer, output of the second dense layer is concatenated with the output of the first dense layer and the original input and passed to a third dense layer, and after passing through the same sequence of operations, a resultant feature map is concatenated with the original input, the output of the first dense layer, and the output of the second dense layer to create a final feature representation.

Figure 6:
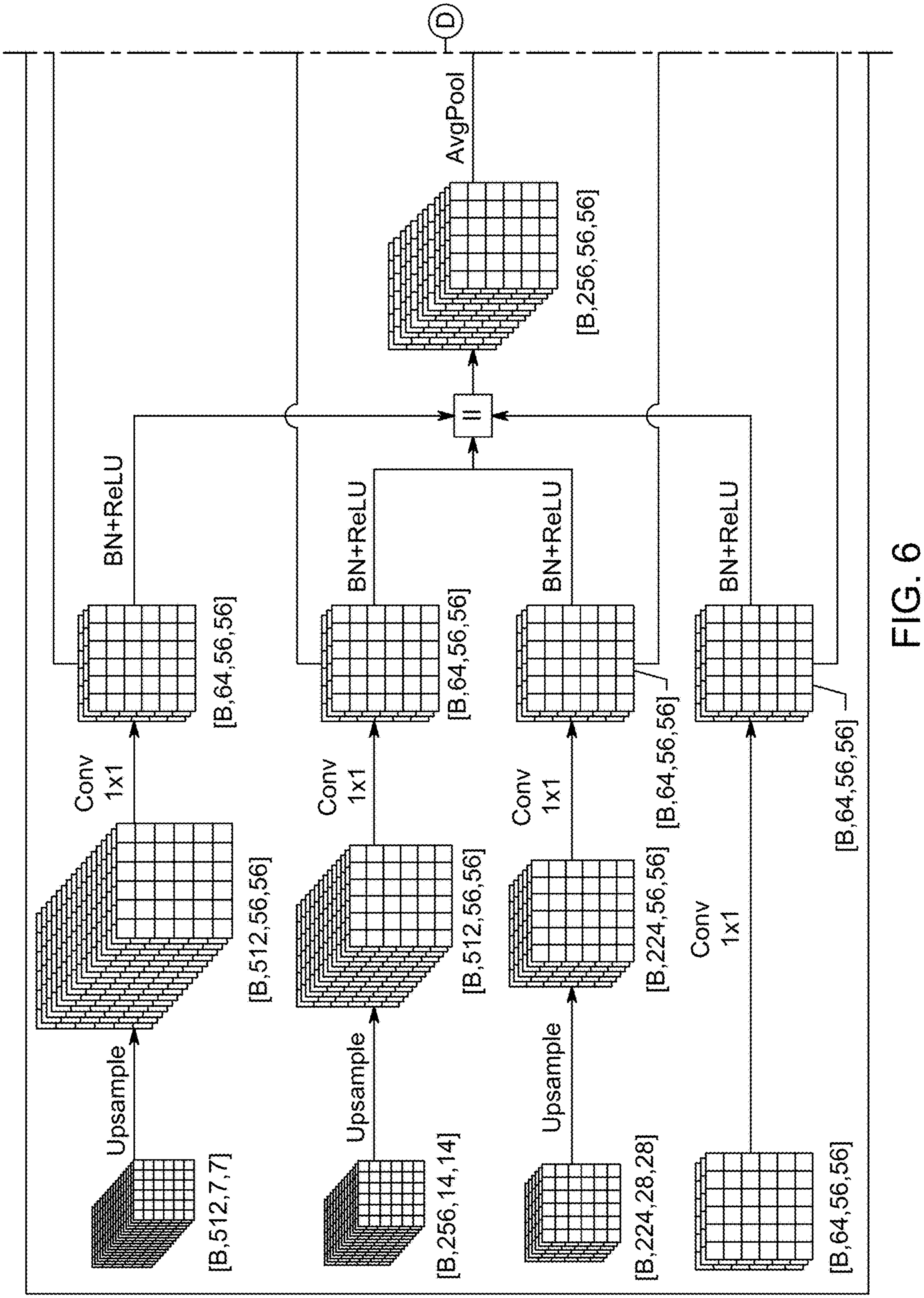
FIG. 6 is an illustration of a cross scale feature fusion block configured to combine feature representations obtained from multiple spatial scales.
Figure 6:
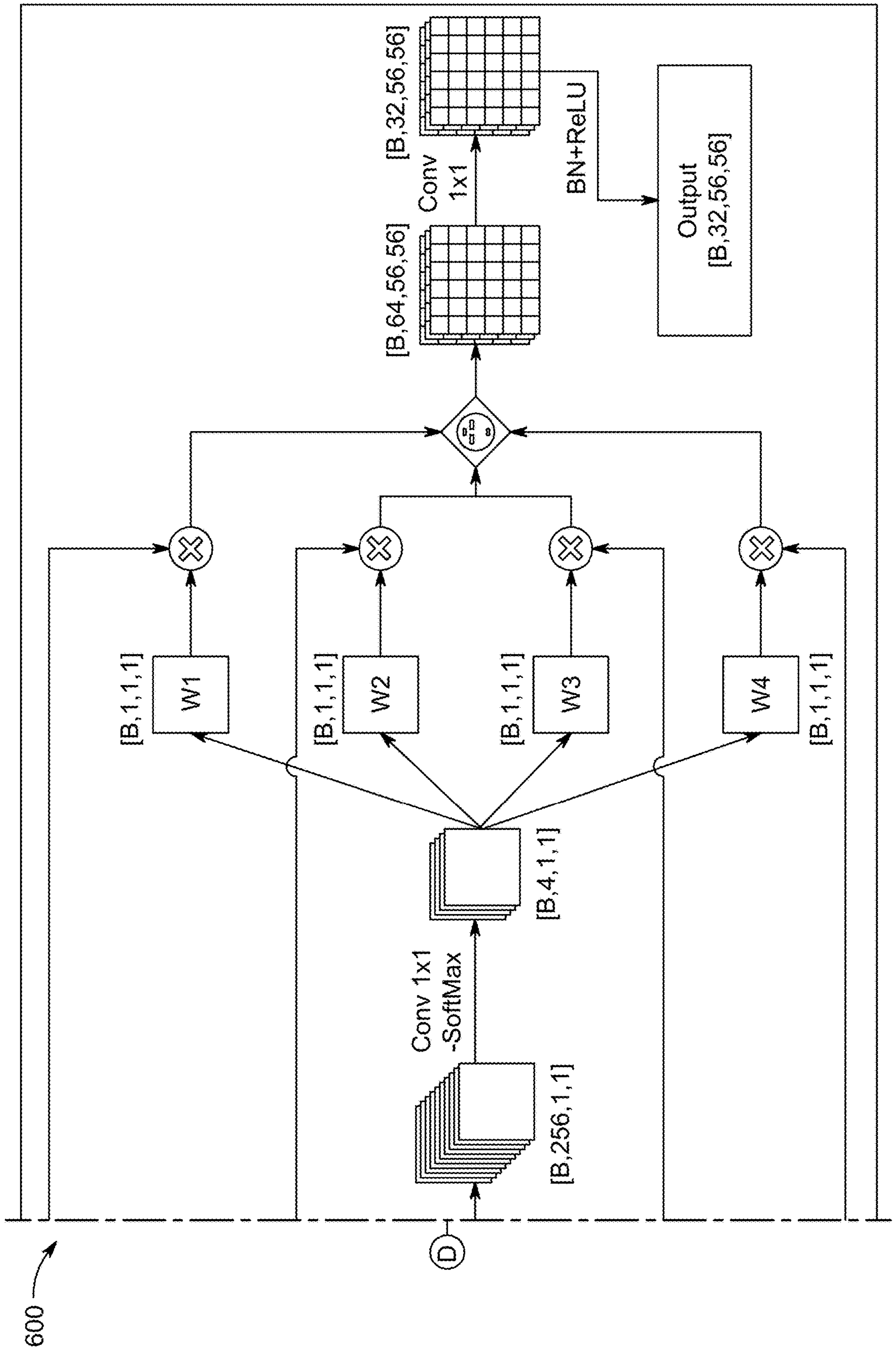

FIG. 6 illustrate a cross scale feature fusion block 600. The cross scale feature fusion (CSFF) block 600 is configured for integrating information across different spatial resolutions. The cross scale feature fusion block 600 receives outputs of multiple branches and effectively combines features from multiple scales into a fused feature representation for further processing. The cross scale feature fusion block 600 is implemented in the remote sensing image classification architecture in which feature maps generated at different resolutions and with different channel numbers are aligned, weighted, and fused to provide a more comprehensive representation of a scene. In the configuration depicted in FIG. 6, all designed blocks of the cross scale feature fusion block 600 are presented separately.

The cross scale feature fusion block 600 receives feature maps from four scales $\{F_1, F_2, F_3, F_4\}$ having different spatial dimensions and channel numbers. In the illustrated configuration, a first feature map is represented by [B, 512, 7, 7], a second feature map is represented by [B, 256, 14, 14], a third feature map is represented by [B, 224, 28, 28], and a fourth feature map is represented by [B, 64, 56, 56]. In these tensor representations, B denotes batch size, the middle value denotes channel number, and the last two values denote dimensions. The first feature map, the second feature map, and the third feature map correspond to coarser-resolution feature maps generated at deeper stages of a multi-scale feature extractor, while the fourth feature map corresponds to a finer-resolution feature map generated at a shallower stage. The cross scale feature fusion block 600 therefore receives representations containing different semantic levels and different receptive-field characteristics.

The fusion process in the cross scale feature fusion block 600 involves up sampling of feature maps to a standard scale. In the illustrated configuration, the first feature map [B, 512, 7, 7] is up sampled to [B, 512, 56, 56], the second feature map [B, 256, 14, 14] is up sampled to [B, 256, 56, 56], and the third feature map [B, 224, 28, 28] is up sampled to [B, 224, 56, 56]. The fourth feature map [B, 64, 56, 56] is already at the standard spatial scale and therefore is processed without spatial up sampling. Each feature map is then passed through a 1×1 convolutional layer to align channel dimensions to a standard channel format represented by [B, 64, 56, 56]. The 1×1 convolutional layer is followed by batch normalization and ReLU activation. Batch normalization normalizes intermediate activations, and ReLU activation introduces nonlinear transformation. The cross scale feature fusion block 600 therefore converts feature maps from four different scales into standard feature maps having common spatial dimensions and common channel dimensions before fusion. The standard feature maps are denoted as $F_1'$, $F_2'$, $F_3'$, and $F_4'$. The standard feature maps are mathematically defined as follows:

$$F_{con} = [F_1', F_2', F_3', F_4'] \tag{15}$$

$$F_i' = \begin{cases} W_{1\times 1} * F_i & \text{for } i = 1 \\ W_{1\times 1} * \sqcup(F_i) & \text{otherwise} \end{cases} \tag{16}$$

where $\sqcup$ represents upsampling and $F_i$ represents the feature map of $i^{th}$ scale. Equation (16) therefore expresses that each feature map is transformed by a 1×1 convolutional layer, with upsampling applied to scales that are not already at the standard spatial size.

After channel alignment and activation, the standard feature maps are concatenated. In the illustrated configuration, concatenation of the four standard feature maps produces a concatenated feature map represented by [B, 256, 56, 56]. An average pooling layer is then applied to the concatenated feature map to reduce the spatial dimensions from 56×56 to 1×1. The average pooling operation aggregates information across the spatial extent of the concatenated feature map and produces a pooled tensor represented by [B, 256, 1, 1], as shown at connection point D in FIG. 6. The pooled tensor is then passed through a 1×1 convolutional layer followed by SoftMax activation to generate attention weights for each scale. In the illustrated configuration, the pooled tensor is transformed into a tensor represented by [B, 4, 1, 1], corresponding to four scale-specific weights. The four attention weights are labeled in FIG. 6 as W1, W2, W3, and W4, with each weight represented by [B, 1, 1, 1]. The weights for each scale are calculated as follows:

$$\overline{\omega}_i = \lambda(W_{1\times 1} * \Cap(F_{con})) \tag{17}$$

where $\lambda$ represents SoftMax activation and $\overline{\omega}_i$ represents the attention weights for $i^{th}$ scale. Equation (17) therefore expresses that a pooled representation of concatenated multi-scale features is transformed into scale-specific attention weights through 1×1 convolution and SoftMax activation.

The cross scale feature fusion block 600 multiplies each standard feature map by a respective attention weight. In the illustrated configuration, W1 is multiplied with the first standard feature map, W2 is multiplied with the second standard feature map, W3 is multiplied with the third standard feature map, and W4 is multiplied with the fourth standard feature map. Each multiplication operation applies scale-specific weighting to the corresponding standard feature map. The weighted feature maps are then aggregated and passed to a final fusion stage. In the illustrated configuration, the aggregated feature representation is shown as [B, 64, 56, 56]. A final 1×1 convolutional layer is applied as a fusion layer to convert the feature map from [B, 64, 56, 56] to [B, 32, 56, 56]. Batch normalization and ReLU activation are then applied before passing the fused feature map for further processing. The final output of the cross scale feature fusion block 600 is mathematically computed as:

$$F_{out} = \sigma\left(\oint\left(W_{1\times 1}\left[\sum_{i=1}^{4}\overline{\omega}\times F_i'\right]\right)\right) \tag{18}$$

where $\phi$ denotes batch normalization, $\sigma$ denotes ReLU activation, $\overline{\omega}_i$ denotes the attention weights for $i^{th}$ scale, and $F_i'$ denotes the standard feature map corresponding to $i^{th}$ scale. Equation (18) therefore expresses that weighted multi-scale feature maps are aggregated, passed through a fusion 1×1 convolutional layer, and transformed by batch normalization and ReLU activation to generate a fused output feature map.

The cross scale feature fusion block 600 therefore dynamically integrates information across multiple different spatial resolutions from a number of branches to obtain a fused feature map. The first feature map may contribute deeper semantic content extracted at a coarse spatial scale. The second feature map may contribute intermediate semantic content at an intermediate spatial scale. The third feature map may contribute additional structural content at a finer intermediate scale. The fourth feature map may contribute local spatial detail preserved at a higher spatial resolution. The scale-specific attention weights permit the cross scale feature fusion block 600 to adaptively emphasize or reduce contributions from respective scales according to content of an input scene. Illustrative examples include emphasizing finer-scale feature maps for detailed texture-rich scenes such as dense urban layouts or emphasizing coarser-scale feature maps for larger semantic regions such as agricultural parcels, water bodies, forests, or desert formations. The cross scale feature fusion block 600 can therefore provide a more holistic and context-aware understanding of remote sensing imagery by integrating complementary information obtained from different spatial resolutions.

The output of the cross scale feature fusion block 600 is passed for further processing. In one configuration disclosed for the overall architecture, the output of the cross scale feature fusion block is passed to a classification head. The classification head processes the fused feature map through four parallel branches. The first three branches consist of a convolutional layer followed by batch normalization and a ReLU activation layer. The convolutional layer in the first branch is a pointwise convolution with a 1×1 kernel size. The second and third branches contain dilated convolutional layers with a kernel size of 3×3, with dilation rate 6 in the second branch and dilation rate 12 in the third branch. The fourth branch applies adaptive average pooling before a 1×1 pointwise convolutional layer and then upsamples the feature map after batch norm and ReLU layer to match size of outputs of other branches. Output of all branches is concatenated and, in block 143, passed through a 1×1 convolutional layer followed by batch norm, ReLU, and a dropout layer. A resultant feature map is passed through an average pooling and max pooling layer simultaneously, followed by a flatten layer before concatenation. The concatenated feature map is passed through a series of linear, ReLU, and dropout layers 144 to generate final classification 146.

FIG. 6 therefore depict a complete processing flow for the cross scale feature fusion block 600 beginning with receiving feature maps from four scales, up sampling feature maps to a standard scale, aligning channel dimensions through 1×1 convolutional layers, applying batch normalization and ReLU activation, concatenating standard feature maps, generating attention weights through average pooling and SoftMax activation, weighting the standard feature maps according to the generated attention weights, aggregating the weighted feature maps, and applying a final 1×1 convolutional layer followed by batch normalization and ReLU activation to generate an output feature map represented by [B, 32, 56, 56]. The processing sequence illustrated in FIG. 6 corresponds to a cross scale feature fusion block configured to integrate information across different spatial resolutions and to generate a fused feature representation for classification of remote sensing imagery.

The MSRA-Net framework therefore contributes to broader global sustainability objectives by enabling reliable, scalable, and data-driven analysis of remote sensing imagery across environmental, agricultural, and urban domains. Through improved classification accuracy and efficient multi-scale feature analysis, the technology supports informed monitoring of land use, water resources, ecological systems, and infrastructure development. Such capabilities facilitate more effective planning, conservation, and resource management practices by governmental agencies, research institutions, and commercial entities. Accordingly, deployment of the MSRA-Net architecture in remote sensing platforms and geospatial analytics systems supports technological advancement while promoting environmentally responsible decision-making and long-term sustainable development across multiple sectors.

Figure 7:
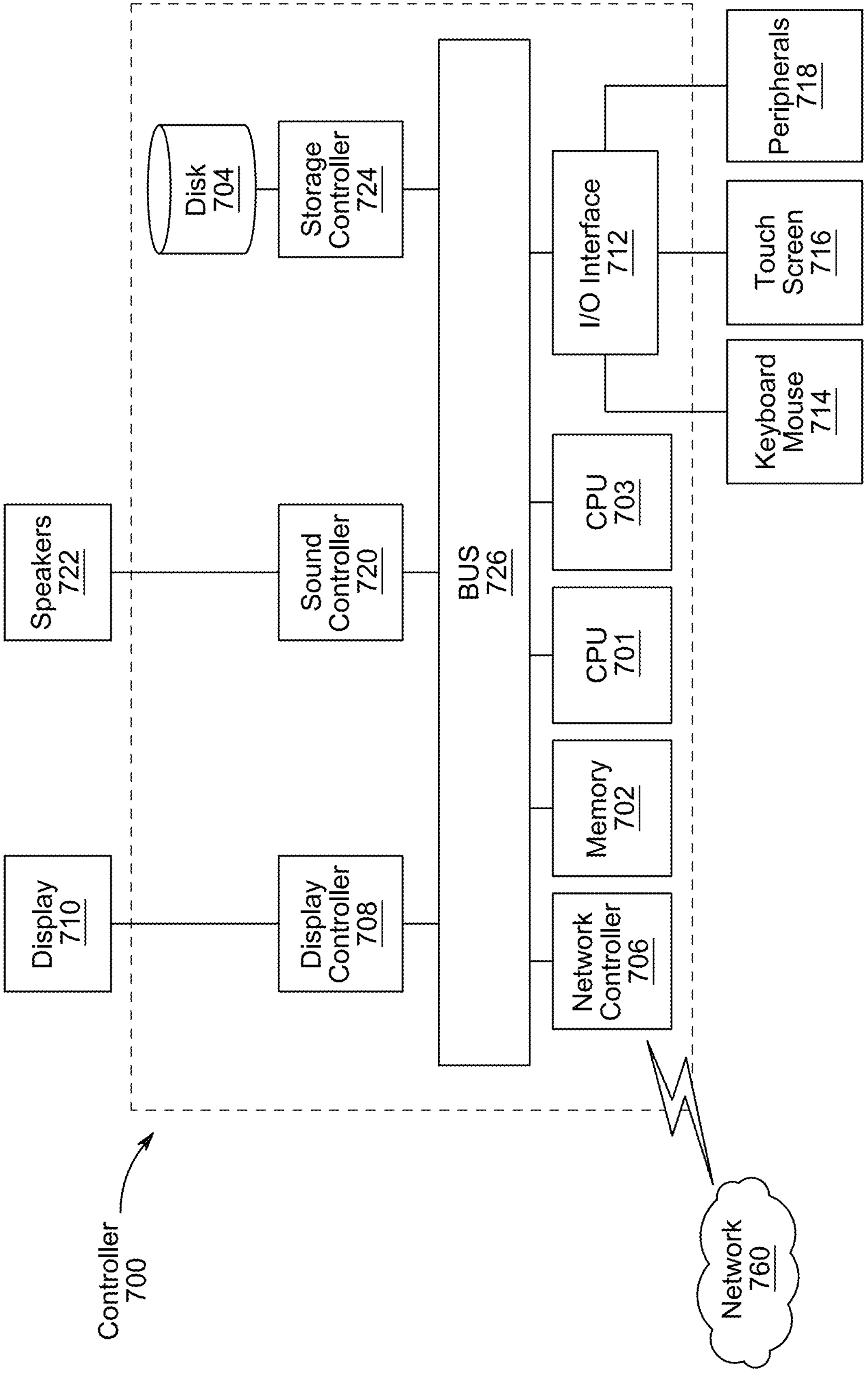
FIG. 7 is an illustration of a non-limiting example of details of computing hardware used in the computing system, according to certain embodiments.

Next, further details of the hardware description of the computing environment according to exemplary embodiments of a base station is described with reference to FIG. 7. In FIG. 7, a controller 700 is described is representative of the system in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows, UNIX, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or MultiCore processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
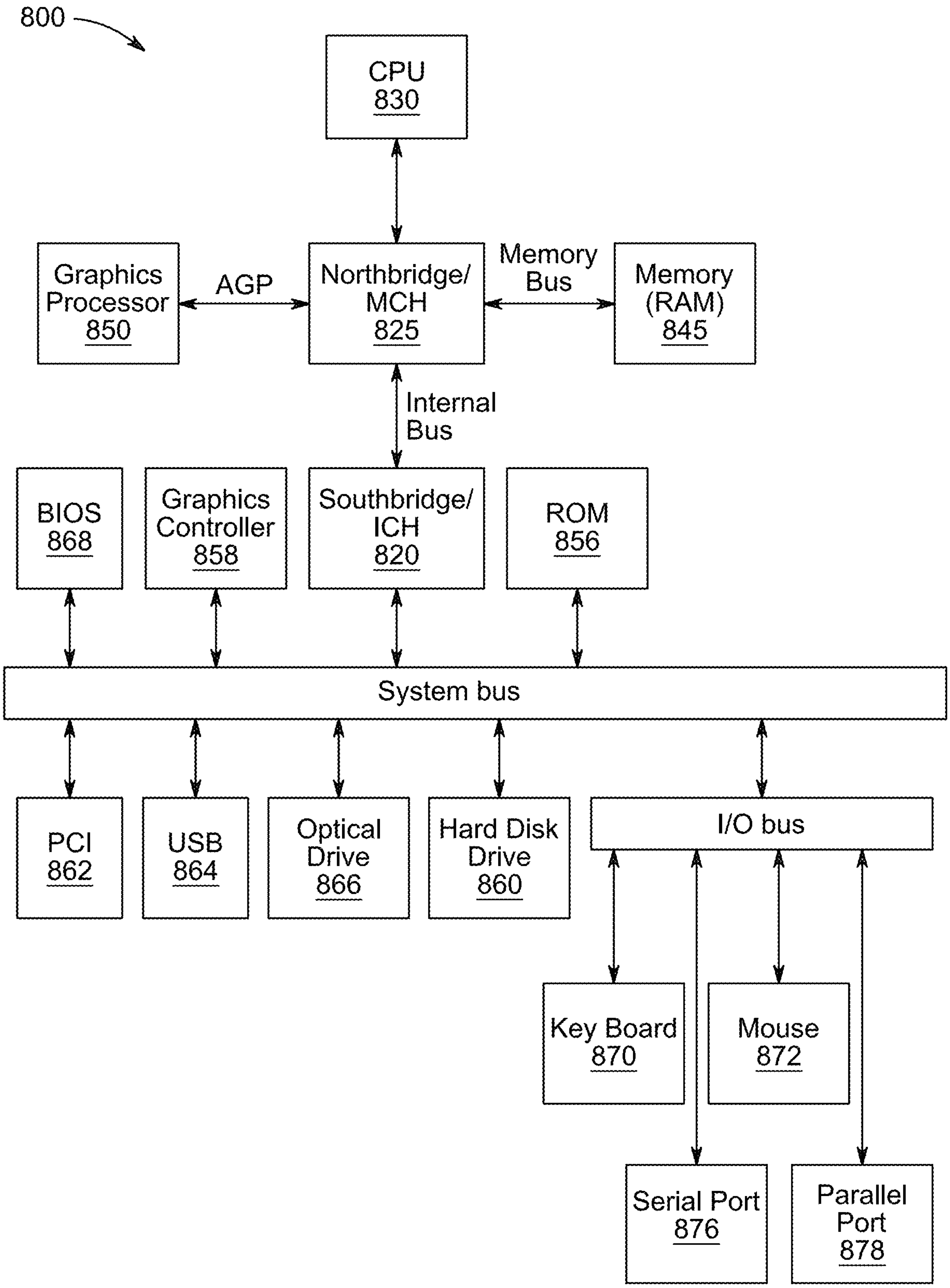
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
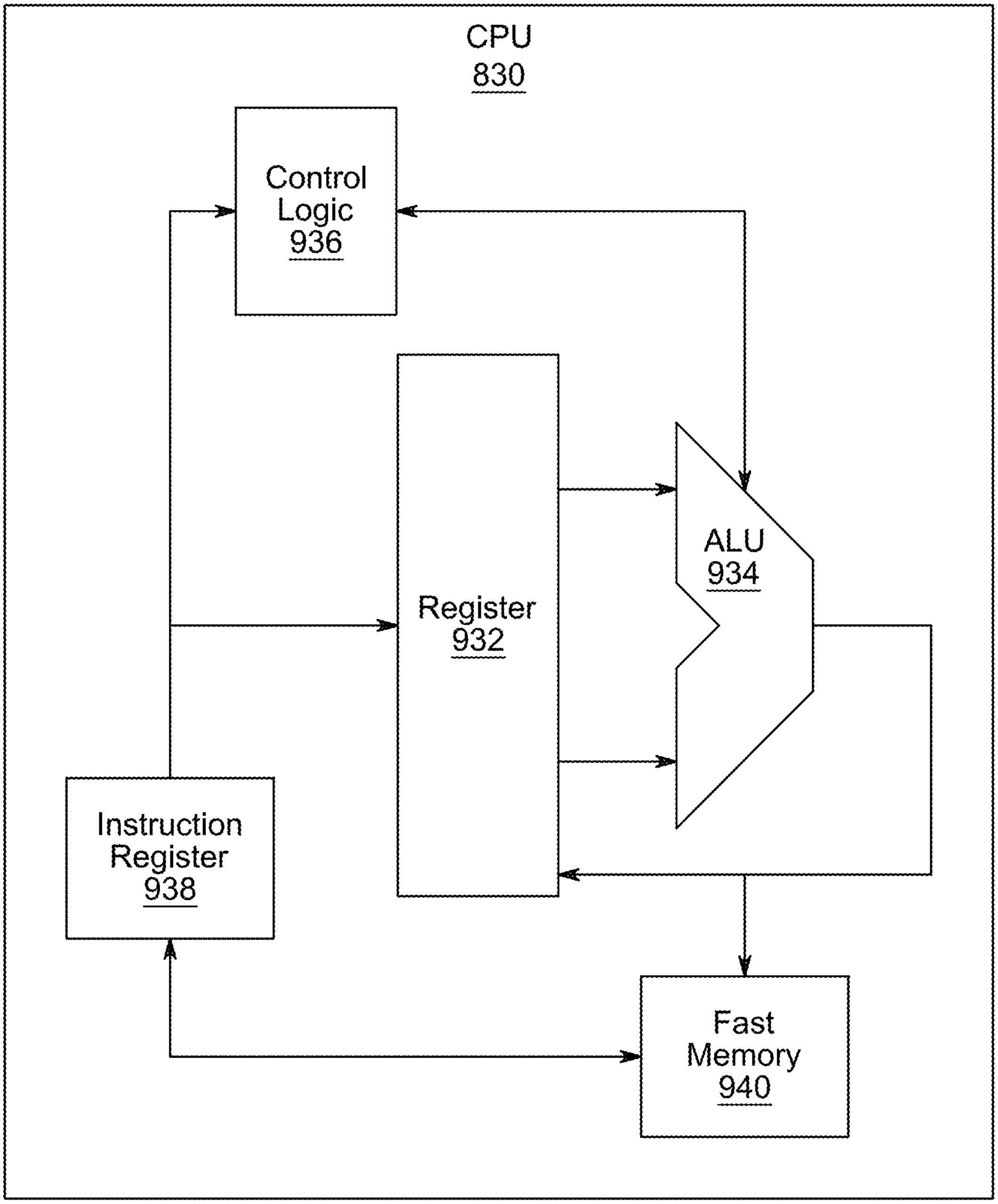
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
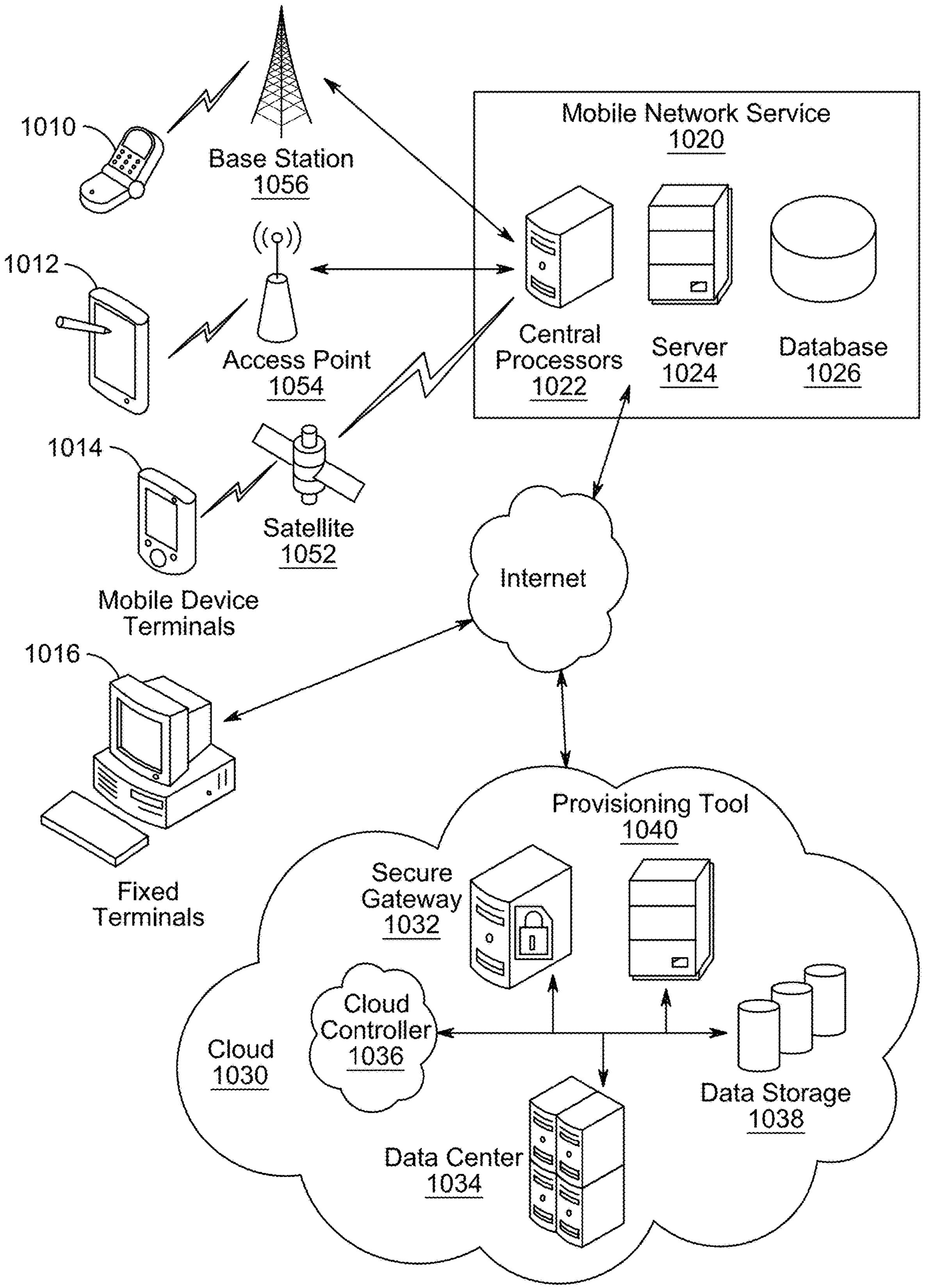
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). More specifically, FIG. 10 illustrates client devices including a smart phone 1011, a tablet 1012, a mobile device terminal 1014 and fixed terminals 1016. These client devices may be commutatively coupled with a mobile network service 1020 via a base station 1056, an access point 1054, a satellite 1052 or via an internet connection. The mobile network service 1020 may comprise central processors 1022, a server 1024 and a database 1026. The fixed terminals 1016 and the mobile network service 1020 may be commutatively coupled via an internet connection to functions in cloud 1030 that may comprise a security gateway 1032, a data center 1034, a cloud controller 1036, a data storage 1038 and a provisioning tool 1040. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

Figure 11:
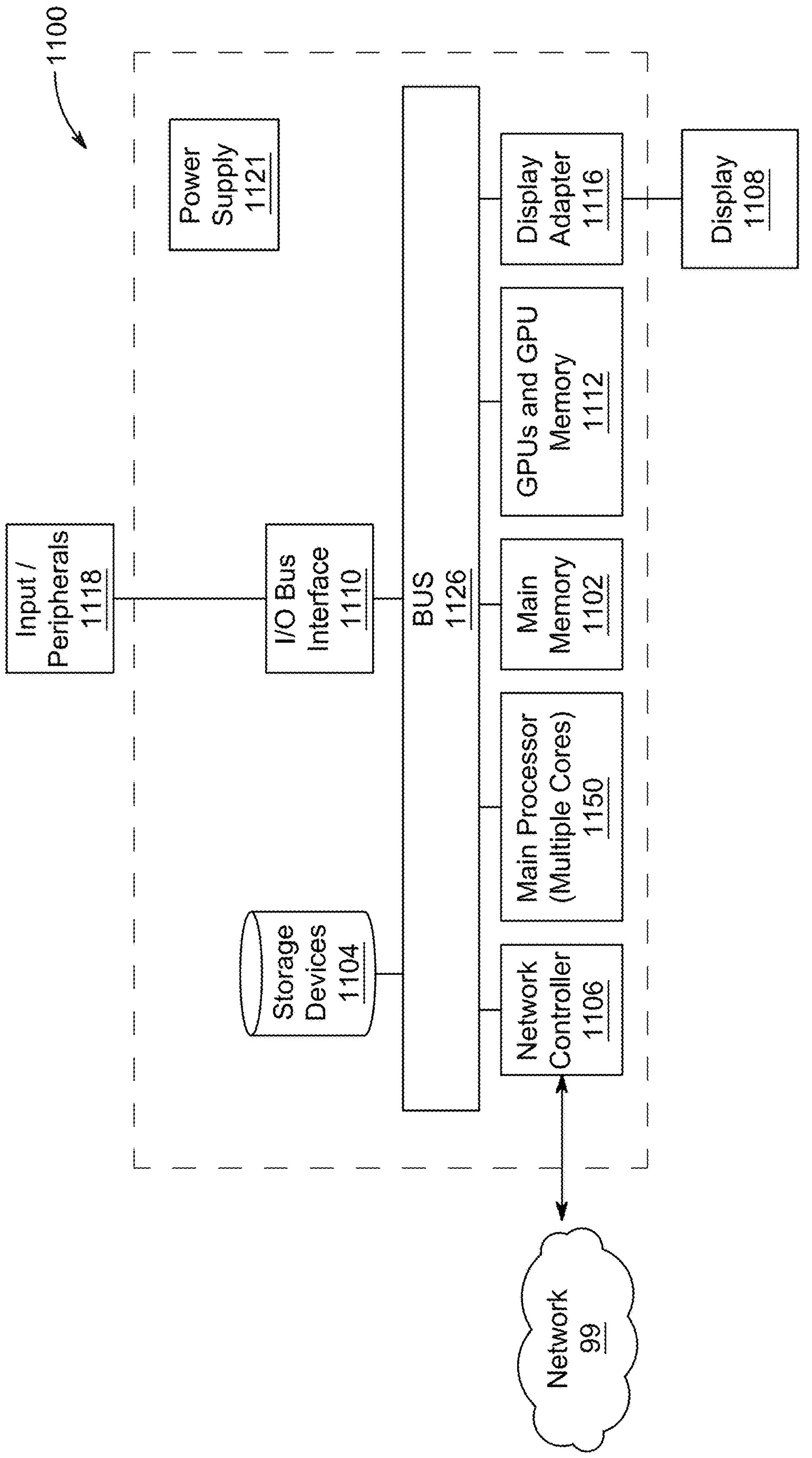
FIG. 11 is a block diagram illustrating an example computer system for implementing the machine learning training and inference methods according to an exemplary aspect of the disclosure.

FIG. 11 is a block diagram illustrating an example AI workstation computer system for implementing the machine learning training and inference methods according to an exemplary aspect of the disclosure. The computer system may be an AI workstation running an operating system, for example Ubuntu Linux OS, Windows, a version of Unix OS, or Mac OS. The computer system 1100 may include one or more central processing units (CPU) 1150 having multiple cores. The computer system 1100 may include a graphics board 1112 having multiple GPUs, each GPU having GPU memory. The graphics board 1112 may perform many of the mathematical operations of the disclosed machine learning methods.

In an exemplary implementation, the AI workstation is configured with an NVIDIA GA100 GPU or later. This GPU includes 512 tensor cores for machine learning applications. This GPU pairs 40 GB HBM2e memory with the A100 PCIe 40 GB, which are connected using a 5120-bit memory interface.

A full implementation of the GA100 GPU includes the following units: 8 GPCs, 8 TPCs/GPC, 2 SMs/TPC, 16 SMs/GPC, 128 SMs per full GPU; 64 FP32 CUDA Cores/SM, 8192 FP32 CUDA Cores per full GPU; 4 third-generation Tensor Cores/SM, 512 third-generation Tensor Cores per full GPU; and 6 HBM2 stacks, 12 512-bit memory controllers.

An NVIDIA A100 Tensor Core performs fused multiply-add (FMA) operations, accelerating matrix multiplications by multiplying two 4×4 matrices and adding the result to a third matrix, often in a single, high-throughput clock cycle.

The computer system 1100 includes main memory 1102, typically random access memory RAM, which contains the software being executed by the processing cores 1150 and GPUs 1112, as well as a non-volatile storage device 1104 for storing data and the software programs. Several interfaces for interacting with the computer system 1100 may be provided, including an I/O Bus Interface 1110, Input/Peripherals 1118 such as a keyboard, touch pad, mouse, Display Adapter 1116 and one or more Displays 1108, and a Network Controller 1106 to enable wired or wireless communication through a network 99. The interfaces, memory and processors may communicate over the system bus 1126. The computer system 1100 includes a power supply 1121, which may be a redundant power supply.

In some embodiments, the computer system 1100 may include a server CPU and a 5 graphics card by NVIDIA, in which the GPUs have multiple CUDA cores. In some embodiments, the computer system 1100 may include a SoC that incorporates different processors, including a neural engine 1112, multi-core CPU, as well as a GPU.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for alerting crop disease or pest infestation, comprising:

a subscription-based service provider including
- a database system configured to maintain customer account information including a growing region, and
- an alert system configured to send out alert messages to selected customers;

satellite-based and aerial remote imaging devices to capture RGB images of Earth and attach Earth location and date information to each RGB image;

machine learning processing circuitry configured with a stem module to convert the RGB images into a high-dimensional feature map;

a multi-scale feature extractor including a plurality of consecutive branches to learn representations of the high-dimensional feature map at different resolutions and semantic levels iteratively, each branch includes at least one adaptive inverted block (AIB) and a multi-scale channel attention module, one branch includes a lightweight dense block (LDB) that reuses features across multiple scales, wherein each adaptive inverted block first projects an input feature map of a previous block into a higher-dimensional space, performs depthwise convolution to model spatial dependencies, and then projects back to a desired output dimension, wherein each adaptive inverted block includes a spatial spectral attention block, wherein the spatial spectral attention block is configured to process spectral and spatial features simultaneously to create a refined and informed feature map;

a cross scale feature fusion block configured to dynamically integrate information across multiple different spatial resolutions from the plurality of branches to obtain a fused feature map;

a classification head configured to classify the RGB images by processing the fused feature map through a plurality of parallel branches, wherein an output of all the parallel branches is concatenated and passed through a 1×1 convolutional layer, and a further concatenated feature map is passed through a series of final layers to generate a final classification;

an output device configured to output a crop class label for a final concatenated image for each of the RGB images; and processing circuitry configured to organize the RGB images labeled with crop class label by the location and the date; and transmit RGB images, together with class label, location and date to the subscription-based service provider when the class label is for a pest or disease infestation type, wherein the subscription-based service provider sends out an alert message to selected customers in a respective growing region to inform of the location and the type of pest or disease infestation.

2. The system of claim 1, wherein the multi-scale feature extractor includes a first branch having two adaptive inverted blocks followed by a first respective multi-scale channel attention module to extract low-level features and select informative channels, a second branch having two adaptive inverted blocks, a lightweight dense block, and a second respective multi-scale channel attention module, to extract second features and select informative channels higher than the first branch, a third branch having three adaptive inverted blocks followed by a third respective multi-scale channel attention module, to extract third features and select informative channels higher than the second branch, and a fourth branch having two adaptive inverted blocks followed by a fourth respective multi-scale channel attention module, to extract third features and select informative channels higher than the third branch.

3. The system of claim 1, wherein the spatial spectral attention block takes a feature map of an associated adaptive inverted block and applies max and average pooling simultaneously to obtain respective feature maps.

4. The system of claim 3, wherein the respective feature maps are passed to their corresponding 1×1 convolutional layers, which create a bottleneck and reduce feature channels by a factor of 16, wherein a resultant reduced feature map is passed through ReLU activation, which follows a 1×1 convolutional layer to restore original dimensions to processed feature maps, wherein the processed feature maps are passed to an additional layer to generate a fused feature map, a sigmoid activation function is applied on the fused feature map to generate attention weights that are multiplied with the original input channels to create a spectrally informed feature map.

5. The system of claim 4, wherein the spectrally informed feature map is passed through spatial attention, where a mean and a max of the feature map are computed simultaneously, wherein the mean and the max feature maps are aggregated along channel dimension and pass through a 7×7 convolutional layer followed by batch norm to create a single feature map, wherein a sigmoid activation function is applied to generate spatial attention weights, which are then multiplied with the spectrally informed feature map to add spatial information to the feature map.

6. The system of claim 5, wherein the output of the spatial spectral block is added to the original feature map that passed to the AIB, forming a residual connection when input dimensions are equal to the output dimensions and stride is equal to 1.

7. The system of claim 1, wherein the lightweight dense block is configured to capture hierarchical feature representations at different abstraction levels within the same spatial scale.

8. The system of claim 1, wherein the lightweight dense block is configured with three dense layers, wherein the first dense layer has a kernel size of 1×1, while the second kernel size is 3×3.

9. The system of claim 1, wherein the lightweight dense block is configured such that output of a first dense layer is concatenated with the original input and passed to a second dense layer, where all operations repeat themselves, output of the second dense layer is concatenated with the output of the first dense layer and the original input and passed to a third dense layer, and after passing through the same sequence of operations, a resultant feature map is concatenated with the original input, the output of the first dense layer, and the output of the second dense layer to create a final feature representation.

10. The system of claim 1, wherein the multi-scale channel attention module dynamically weighs channel importance across different scales using multiple convolution kernel sizes.

11. A non-transitory computer-readable storage medium including computer executable instructions, wherein the instructions, when executed by a computer, cause the computer to perform a method for alerting crop disease or pest infestation, wherein a subscription-based service provider includes a database system configured to maintain customer account information including a growing region, and an alert system configured to send out alert messages to selected customers, the method comprising:

capturing, by satellite-based and aerial remote imaging devices, RGB images of Earth and attaching Earth location and date information to each RGB image;

converting, a stem module of a machine learning processing circuitry, the RGB images into a high-dimensional feature map;

learning, by a multi-scale feature extractor of the machine learning processing circuitry, including a plurality of consecutive branches, representations of the high-dimensional feature map at different resolutions and semantic levels iteratively;

each branch includes at least one adaptive inverted block (AIB) and a multi-scale channel attention module, reusing, by one branch that includes a lightweight dense block (LDB), features across multiple scales;

first projecting, by each adaptive inverted block, an input feature map into a higher-dimensional space;

performing depthwise convolution to model spatial dependencies;

projecting back to a desired output dimension, wherein each adaptive inverted block includes a spatial spectral attention block;

processing, by the spatial spectral attention block, spectral and spatial features simultaneously to create a refined and informed feature map;

dynamically integrating, by a cross scale feature fusion block, information across multiple different spatial resolutions from the plurality of branches to obtain a fused feature map;

classifying, by a classification head, the RGB images by processing the fused feature map through a plurality of parallel branches;

concatenating an output of all the parallel branches and passing through a 1×1 convolutional layer;

passing a further concatenated feature map through a series of final layers to generate a final classification;

outputting, by an output device, a crop class label for a final concatenated image for each of the RGB images;

organizing, by processing circuitry, the RGB images labeled with crop class label by the location and the date; and transmitting RGB images, together with class label, location and date to the subscription-based service provider when the class label is for a pest or disease infestation type, wherein the subscription-based service provider sends out an alert message to selected customers in a respective growing region to inform of the location and the type of pest or disease infestation.

12. The computer-readable storage medium of claim 11, the method further comprising:

extracting, by a first branch having two adaptive inverted blocks followed by a first respective multi-scale channel attention module, low-level features and selecting informative channels;

learning, by a second branch having two adaptive inverted blocks, a lightweight dense block, and a second respective multi-scale channel attention module, second features at a resolution and semantic level higher than the first branch, learning, by a third branch having three adaptive inverted blocks followed by a third respective multi-scale channel attention module, third features at a resolution and semantic level higher than the second branch, and learning, by a fourth branch having two adaptive inverted blocks followed by a fourth respective multi-scale channel attention module, fourth features at a resolution and semantic level higher than the third branch.

13. The computer-readable storage medium of claim 11, the method further comprising taking, by the spatial spectral attention block, a feature map of an associated adaptive inverted block; and applying max and average pooling simultaneously to obtain respective feature maps.

14. The computer-readable storage medium of claim 13, the method further comprising:

reducing, by passing the respective feature maps to their corresponding 1×1 convolutional layers, which create a bottleneck, feature channels by a factor of 16;

restoring, by a resultant reduced feature map that is passed through ReLU activation, which follows a 1×1 convolutional layer, original dimensions to processed feature maps;

generating, by passing the processed feature maps to an additional layer, a fused feature map;

creating, by applying a sigmoid activation function on the fused feature map and generating attention weights that are multiplied with the original input channels, a spectrally informed feature map.

15. The computer-readable storage medium of claim 14, the method further comprising:

simultaneously computing, by passing the spectrally informed feature map through spatial attention, s mean and max of the feature map;

creating, by aggregating the mean and max feature maps along channel dimension and passing through a 7×7 convolutional layer followed by batch norm, a single feature map;

applying a sigmoid activation function to generate spatial attention weights; and multiplying the spatial attention weights with the spectrally informed feature map to add spatial information to the feature map.

16. The computer-readable storage medium of claim 15, the method further comprising adding the output of the spatial spectral block to the original feature map that passed to the AIB, forming a residual connection when input dimensions are equal to the output dimensions and stride is equal to 1.

17. The computer-readable storage medium of claim 11, further comprising capturing, by the lightweight dense block, hierarchical feature representations at different abstraction levels within the same spatial scale.

18. The computer-readable storage medium of claim 11, wherein the lightweight dense block is configured with three dense layers, wherein the first dense layer has a kernel size of 1×1, while the second kernel size is 3×3.

19. The computer-readable storage medium of claim 11, further comprising:

concatenating an output of a first dense layer with the original input and passing to a second dense layer, where all operations repeat themselves;

concatenating an output of the second dense layer with the output of the first dense layer and the original input and passing to a third dense layer; and after passing through the same sequence of operations, concatenating a resultant feature map with the original input, the output of the first dense layer, and the output of the second dense layer to create a final feature representation.

20. The computer-readable storage medium of claim 11, the method further comprising dynamically weighing, by the multi-scale channel attention module, channel importance across different scales using multiple convolution kernel sizes.

* * * * *